United States Patent
Hossain

(10) Patent No.: US 12,461,037 B1
(45) Date of Patent: Nov. 4, 2025

(54) HYDROPHOBIC COPPER THIN FILM FOR SURFACE PLASMON RESONANCE-BASED SENSOR

(71) Applicant: King Fahd University of Petroleum and Minerals, Dhahran (SA)

(72) Inventor: Mohammad Kamal Hossain, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/242,430

(22) Filed: Jun. 18, 2025

Related U.S. Application Data

(60) Provisional application No. 63/796,647, filed on Apr. 29, 2025.

(51) Int. Cl.
  *G01N 21/77*   (2006.01)
  *B01L 3/00*    (2006.01)
  (Continued)

(52) U.S. Cl.
  CPC .............. *G01N 21/77* (2013.01); *B01L 3/502* (2013.01); *B01L 3/5027* (2013.01);
  (Continued)

(58) Field of Classification Search
  None
  See application file for complete search history.

(56) References Cited

U.S. PATENT DOCUMENTS 6,268,125 B1 * 7/2001 Perkins ................ G01N 21/553
                                                        436/805
2006/0257290 A1 * 11/2006 Shimizu .................. B01L 3/502
                                                        422/400
(Continued)

FOREIGN PATENT DOCUMENTS

JP        2011/242306 A        12/2011

OTHER PUBLICATIONS

Yingcui Fang, et al., "Effects of oxidation on the localized surface plasmon resonance of Cu nanoparticles fabricated via vacuum coating", Vacuum, vol. 184, Feb. 2021, 109965, Excerpts only, 7 pages.

(Continued)

*Primary Examiner* — Neil N Turk
(74) *Attorney, Agent, or Firm* — Oblon, McClelland, Maier & Neustadt, L.L.P.

(57) ABSTRACT

A surface plasmon resonance sensor system includes a sensor plate having a quartz glass substrate and a copper film sputtered onto the substrate and annealed for about two hours. A quartz prism is attached to a surface of the sensor plate, and a microfluidics unit containing carrier fluid is attached to the opposite surface. A target analyte reservoir is connected through a pump to inject target analytes into the microfluidics unit. A binder is attached to the copper film and binds to target analytes. A laser transmits a beam into the quartz prism at an incident angle that generates surface plasmons resonating with the copper film and reflects a phase shifted laser beam. Receive optics and a charge (Continued)

coupled device convert the phase shifted beam to electrical signals. A computing unit processes the electrical signals to compute refractive index changes based on phase shifts to indicate target analyte detection.

9 Claims, 29 Drawing Sheets

(51) Int. Cl.
    *G01N 21/41*     (2006.01)
    *G01N 21/552*     (2014.01)
    *G01N 33/543*     (2006.01)

(52) U.S. Cl.
    CPC ........ *B01L 3/502715* (2013.01); *G01N 21/41* (2013.01); *G01N 21/553* (2013.01); *G01N 21/554* (2013.01); *G01N 33/54373* (2013.01); *G01N 2021/7776* (2013.01)

(56) References Cited

U.S. PATENT DOCUMENTS

| | | |
|---|---|---|
| 2007/0139654 A1 | 6/2007 | Matsumoto et al. |
| 2011/0188043 A1* | 8/2011 | Davidov .............. G01N 21/553 356/445 |
| 2015/0323525 A1* | 11/2015 | Vidarsson ........ G01N 33/54373 506/9 |
| 2017/0200526 A1 | 7/2017 | Guo et al. |

OTHER PUBLICATIONS

Veronika Lacmanova, et al., "Annealing of Cu nanolayers on glass: Structural, mechanical and thermodynamic analysis", Vacuum, vol. 212, Jun. 2023, 111991, Excerpts only, 8 pages.

Mohammad Kamal Hossain et al., "Fabrication and wetting characteristics of copper thin film; An active layer for SPR-based sensor applications", Journal of Science: Advanced Materials and Devices, vol. 10, Dec. 22, 2024, 100839, 10 pages.

\* cited by examiner

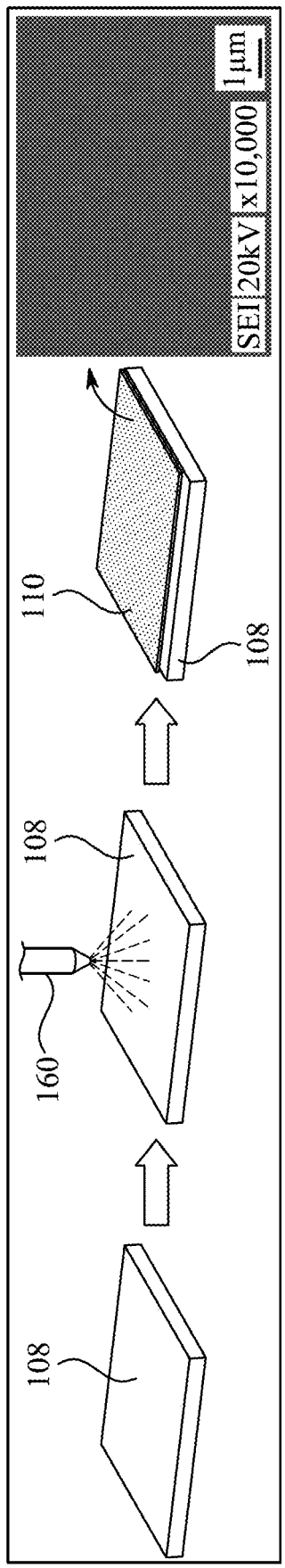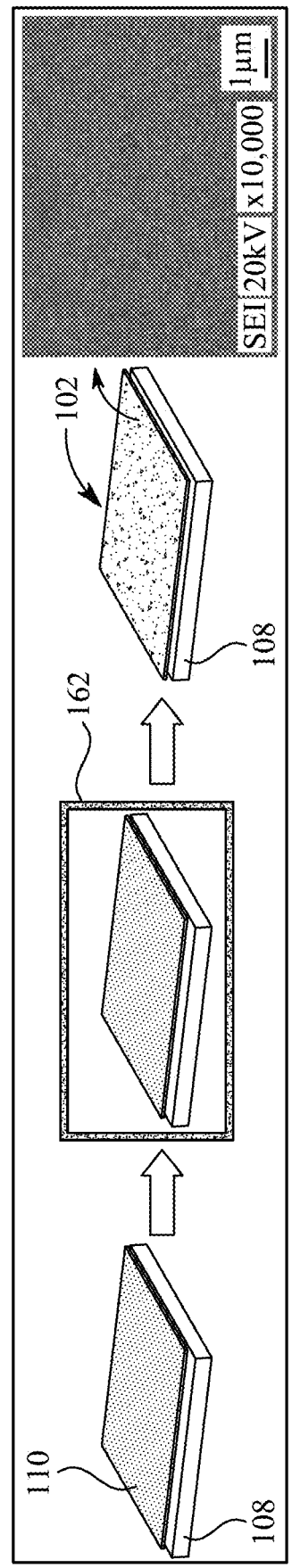
FIG. 3A
FIG. 3B

HYDROPHOBIC COPPER THIN FILM FOR SURFACE PLASMON RESONANCE-BASED SENSOR

CROSS REFERENCE TO RELATED APPLICATIONS

The present application claims the benefit of priority to U.S. Prov. App. No. 63/796,647, entitled "Fabrication of Hydrophobic Copper Thin Film for Surface Plasmon Resonance-Based Sensor Application", filed on Apr. 29, 2025, and incorporated herein by reference in its entirety.

STATEMENT OF ACKNOWLEDGEMENT

Support provided by the King Fahd University of Petroleum and Minerals (KFUPM), Dhahran, Saudi Arabia through IRC-SES Grant INSE2413 is gratefully acknowledged.

BACKGROUND

Technical Field

The present disclosure is directed to surface plasmon resonance sensors, and more particularly to surface plasmon resonance sensor systems utilizing hydrophobic copper thin films for detecting target analytes through refractive index measurements.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Surface Plasmon Resonance (SPR) sensors are widely used in various detection applications due to their ability to detect changes in refractive index at metal-dielectric interfaces. SPR sensors detect changes in the refractive index of the dielectric near the metal layer by using electromagnetic surface plasmon waves traveling at the interface between the dielectric and the metallic layer. Traditional SPR sensors primarily utilize gold and silver thin films as the plasmonic material due to their optical properties and stability. However, these precious metals present significant cost considerations and availability limitations for widespread commercial applications. The high cost of gold and silver-based sensors restricts their implementation in many practical sensing applications where economic factors are important considerations.

Copper-based thin films have emerged as potential alternatives to precious metal films in SPR sensor applications. Copper and copper-based thin films provide several advantages including abundance, cost-effectiveness, and ease of extraction and processing. Copper (Cu) thin films are simple to manufacture in an environmentally friendly manner and provide excellent anti-interference characteristics and radiation resistance. Cu-based thin films can modulate the intensity and response of surface plasmon resonance, with the thickness of the Cu film affecting the modulation capability. Recent studies have demonstrated that the performance of Cu-based SPR sensors is comparable to those using gold, making Cu-based thin films a competitive alternative to precious metals in SPR sensors.

Conventional approaches for fabricating copper thin films for SPR applications utilize various deposition techniques including electrochemical deposition, physical vapor deposition, chemical vapor deposition, and supercritical fluid chemical deposition. Among these techniques, sputtering, a subset of physical vapor deposition, represents the simplest technique for metal deposition and is commonly used in numerous industries. Sputtering provides advantages such as flexibility in choice of coating materials, good adhesion, high repeatability, and the ability to deposit thin films on a variety of substrates. DC sputtering requires lower sputtering voltage and lower sputtering gas pressures compared to other sputtering techniques such as RF sputtering. For the fabrication of Cu thin films by DC sputtering, it has shown that better adhesion to the substrate is correlated with a lower current value and a longer deposition time.

US20170200526A1 describes making a copper film of about 50 nm in thickness by magnetron sputtering on a fused silica substrate. The copper film is annealed at 200-600° C., but the annealing time is no more than 30 minutes. This reference describes making an electrically conductive film rather than a sensor application. However, this reference does not describe a surface plasmon resonance sensor system comprising a copper film annealed for two hours and integrated with microfluidics and computing components for detecting target analytes through refractive index measurements based on phase shift analysis.

US20070139654A1 describes a surface plasmon resonance sensor device having a thin metal film tip, which may be copper, having a thickness ranging from 10 to 100 nm capable of exciting a surface plasmon. The sensor is dipped into an analyte, which changes the resonance excitation conditions of the surface plasmon, and a change of the laser light is detected by a photodetector to detect antigen-antibody reactions. However, this reference does not describe a surface plasmon resonance sensor system comprising a copper film sputtered onto a glass substrate and annealed for two hours, which is integrated with microfluidics and computing components for detecting target analytes through refractive index measurements based on phase shift analysis.

JP2011242306A describes a chip for measuring SPR using an Ag alloy film on a transparent dielectric substrate with a thickness of about 40-50 nm. The resonance curves and half-widths were measured at incident angles from 30° to 90° for the silver-based system. However, this reference does not describe a surface plasmon resonance sensor system comprising a sputtered copper film integrated with microfluidics and computing components for detecting target analytes through refractive index measurements based on phase shift analysis.

A study titled "Effects of oxidation on the localized surface plasmon resonance of Cu nanoparticles fabricated via vacuum coating" describes surface plasmon resonance of Cu nanoparticles deposited by vacuum deposition, annealed in nitrogen and reduced in an ambient atmosphere to obtain $Cu_2O$, CuO and CuNPs. The study identified strong LSPR of CuNPs with absorption peaks of CuO centered at 4.08 eV at 310 nm and 2.75 eV at 450 nm, and vacuum coating was used to form CuNPs on glass substrates. However, this reference does not describe a surface plasmon resonance sensor system comprising a sputtered copper film annealed for two hours and integrated with microfluidics and computing components for detecting target analytes through refractive index measurements based on phase shift analysis.

A study titled "Annealing of Cu nanolayers on glass: structural, mechanical and thermodynamic analysis" describes thin Cu nanolayers deposited on glass substrates by magnetron sputtering with post-deposition annealing at 300° C. under atmospheric conditions. The study demonstrated that as-sputtered Cu layers on glass were composed of Cu0, $Cu^{1+}$ and $Cu^{2+}$ oxidation states with $Cu_2O$ stable up to 23 nm and CuO above 22 nm. However, this reference does not describe a surface plasmon resonance sensor system comprising a copper film integrated with microfluidics and computing components for detecting target analytes through refractive index measurements based on phase shift analysis.

Each of the aforementioned references suffers from one or more drawbacks hindering their adoption, such as insufficient integration of multiple detection components, limited control over thin film surface properties through thermal processing, lack of systematic approaches for achieving hydrophobic characteristics in copper-based films, inadequate consideration of optimal film thickness for specific wavelength ranges, and absence of sensor systems that combine optical excitation, sample delivery, and signal processing in unified platforms. These limitations result in reduced detection sensitivity, inconsistent measurement performance, and increased complexity in sensor implementation and operation.

Accordingly, it is one object of the present disclosure to provide a surface plasmon resonance sensor system that integrates multiple technologies including controlled copper film fabrication, optical excitation and detection, microfluidics sample delivery, and computational analysis to achieve enhanced target analyte detection capabilities. Another object of the present disclosure is to provide methods of making surface plasmon resonance sensor plates and complete sensor systems that achieve controlled hydrophobic surface properties and optimized optical characteristics through systematic annealing processes.

SUMMARY

In an exemplary embodiment, a surface plasmon resonance sensor system is described, comprising a sensor plate having a first side and a second side, wherein the second side is opposite the first side, wherein the sensor plate includes: a quartz glass substrate, and a copper film sputtered onto the quartz glass substrate and annealed for about two hours; a quartz prism having a base surface attached to the first side of sensor plate; a microfluidics unit attached to the second side of the sensor plate, wherein the microfluidics unit includes a fluid reservoir having an inlet port and an outlet port, wherein the fluid reservoir contains a carrier fluid; a target analyte reservoir containing a target analyte; a pump connected between the target analyte reservoir and the inlet port, wherein the pump is configured to inject the target analyte into the microfluidics unit through the inlet port; a binder attached to the copper film, wherein the binder is configured to attach to the target analyte; a laser configured to transmit a laser beam into a face of the quartz prism at an incident angle configured to generate surface plasmons which resonate with the copper film and reflect a phase shifted laser beam from the copper film; receive optics configured to receive the phase shifted laser beam; a charge coupled device coupled to the receive optics, wherein the charge coupled device is configured to convert the phase shifted laser beam to an electrical signal; and a computing unit including an electrical circuitry, a memory storing program instructions and at least one processor configured to execute the program instructions, wherein the computing unit is configured to receive the electrical signal and compute a refractive index based on the phase shift, wherein a change in the refractive index is configured to indicate detection of the target analyte. a sensor plate having a first side and a second side, wherein the second side is opposite the first side, wherein the sensor plate includes a quartz glass substrate, and a copper film sputtered onto the quartz glass substrate and annealed for about two hours. The surface plasmon resonance sensor system further comprises a quartz prism having a base surface attached to the first side of sensor plate, and a microfluidics unit attached to the second side of the sensor plate, wherein the microfluidics unit includes a fluid reservoir having an inlet port and an outlet port, wherein the fluid reservoir contains a carrier fluid. The surface plasmon resonance sensor system also comprises a target analyte reservoir containing a target analyte, and a pump connected between the target analyte reservoir and the inlet port, wherein the pump is configured to inject the target analyte into the microfluidics unit through the inlet port. The surface plasmon resonance sensor system includes a binder attached to the copper film, wherein the binder is configured to attach to the target analyte, and a laser configured to transmit a laser beam into a face of the quartz prism at an incident angle configured to generate surface plasmons which resonate with the copper film and reflect a phase shifted laser beam from the copper film. The surface plasmon resonance sensor system further comprises receive optics configured to receive the phase shifted laser beam, and a charge coupled device coupled to the receive optics, wherein the charge coupled device is configured to convert the phase shifted laser beam to an electrical signal. The surface plasmon resonance sensor system also includes a computing unit including an electrical circuitry, a memory storing program instructions and at least one processor configured to execute the program instructions, wherein the computing unit is configured to receive the electrical signal and compute a refractive index based on the phase shift, wherein a change in the refractive index is configured to indicate detection of the target analyte.

In another exemplary embodiment, a method of making a surface plasmon resonance sensor plate is described, comprising depositing, by a DC sputtering coater, a film of copper of about 40 nm thickness onto a quartz glass substrate; and annealing, in a tubular furnace, the film of copper for about two hours at a temperature in a range of range of about 200° C. to about 600° C.

In yet another exemplary embodiment, a method of making a surface plasmon resonance sensor is described, comprising, forming a sensor plate by depositing, by a DC sputtering coater, at a pressure in a range of about $1.7 \times 10^{-5}$ torr to about $2.8 \times 10^{-3}$ torr in an argon gas having a flow rate of about 30 SCCM, a film of copper having a thickness range of about 30 nm to about 70 nm thickness onto a quartz glass substrate; annealing, in a tubular furnace, the sensor plate for about two hours at a temperature in a range of 200° C. to about 600° C. and forming an annealed copper film; attaching a base surface of a quartz prism to the quartz glass substrate; attaching a microfluidics unit to the sensor plate, wherein the microfluidics unit includes a fluid reservoir having an inlet port and an outlet port, wherein the fluid reservoir contains a carrier fluid; attaching a binder to the annealed copper film; pumping, by a pump connected between a target analyte reservoir and an input port of the microfluidics unit, a target analyte into a carrier fluid contained within the microfluidics unit; contacting the binder with the target analyte; transmitting, by a laser, a laser beam into a face of the quartz prism at an incident angle configured to generate surface plasmons which resonate with the annealed copper film; reflecting a phase shifted laser beam from the annealed copper film; receiving, with receive optics, the phase shifted laser beam; measuring, by the received optics, an intensity of the phase shifted laser beam; converting, with a charge coupled device coupled to the receive optics, the intensity of the phase shifted laser beam to an electrical signal; receiving, by a computing unit connected to the charge coupled device, the computing unit including an electrical circuitry, a memory storing program instructions and at least one processor configured to execute the program instructions, the electrical signal; and calculating, by the computing unit, a refractive index based on the phase shift of the laser beam, wherein a change in the refractive index from a baseline refractive index indicates detection of the target analyte.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A is a schematic diagram illustrating a first step of fabricating a copper thin film by DC sputtering process onto a quartz glass substrate, according to certain embodiments.

FIG. 3B is a schematic diagram illustrating a second step of annealing the copper thin film at elevated temperatures, according to certain embodiments.

DETAILED DESCRIPTION

Figure 1:
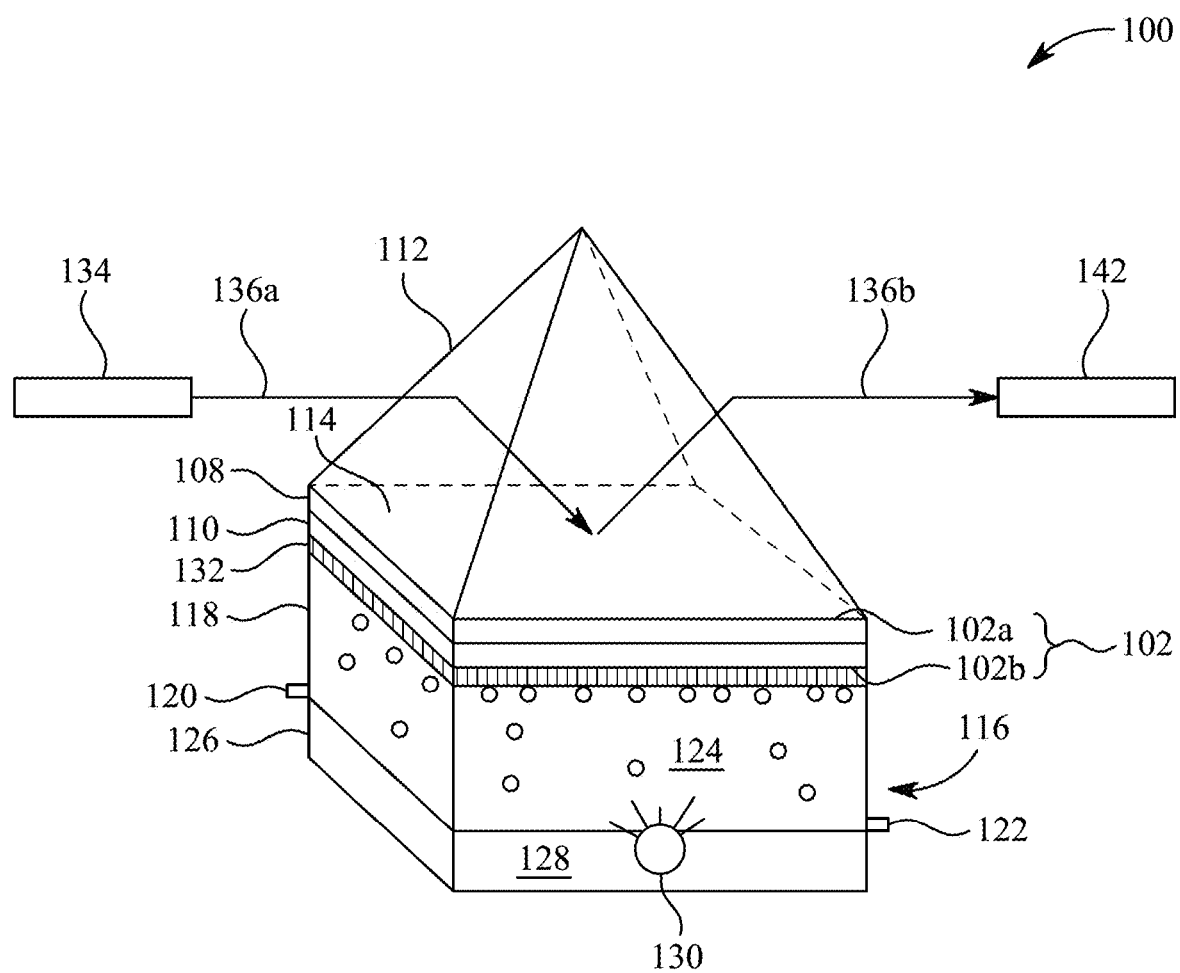
FIG. 1 is a schematic diagram illustrating a surface plasmon resonance sensor system showing the interaction between laser beam, prism, copper film, and target analyte detection mechanism, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a surface plasmon resonance sensor system and methods of making surface plasmon resonance sensor plates and complete sensor systems that utilize copper-based thin films with controlled optical and surface properties for detecting target analytes through refractive index measurements. The surface plasmon resonance sensor system incorporates multiple technological components including materials processing for copper thin film fabrication, optical systems for laser excitation and signal detection, microfluidics platforms for sample delivery and containment, and computational systems for signal processing and analysis. The methods of making enable systematic fabrication of sensor components through controlled deposition and thermal processing techniques that achieve specific film properties required for surface plasmon resonance applications. The approaches disclosed herein provide integrated solutions that address limitations in existing sensor technologies while maintaining cost-effectiveness and manufacturing scalability for practical implementation.

Figure 2:
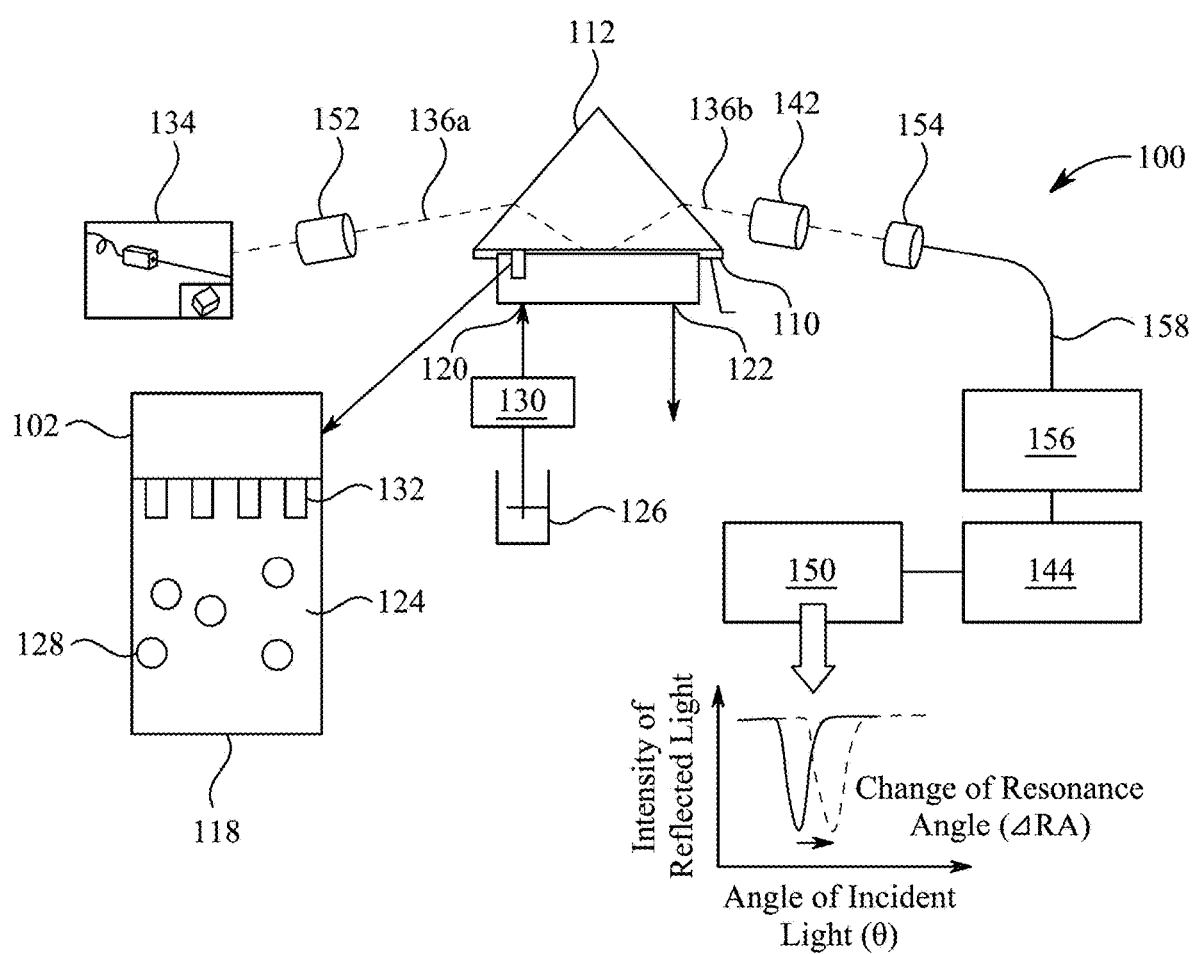
FIG. 2 is a schematic diagram of an optical setup involving the surface plasmon resonance sensor system including polarizer, prism, metal film, microfluidics, receive optics, and detection components, according to certain embodiments.

Referring to FIG. 1, illustrated is a schematic diagram of a surface plasmon resonance sensor system (as represented by reference numeral 100). Further, referring to FIG. 2, illustrated is a schematic diagram showing implementation of the surface plasmon resonance sensor system 100. The surface plasmon resonance sensor system 100 of the present disclosure provides a multi-component platform that integrates optical, mechanical, fluidic, and computational technologies to achieve sensitive and selective detection of target analytes in various sample types. The surface plasmon resonance sensor system 100 functions through the generation and detection of surface plasmons at copper film interfaces, where binding interactions between target analytes and surface-bound binders result in measurable changes in refractive index that are converted to quantitative concentration measurements.

As illustrated in FIGS. 1 and 2 in combination, the surface plasmon resonance sensor system 100 includes a sensor plate 102 having a first side 102a and a second side 102b. Herein, the second side 102b is opposite the first side 102a. The sensor plate 102 provides the structural foundation for the surface plasmon resonance detection mechanism and supports the various functional layers required for target analyte detection. The first side 102a of the sensor plate 102 interfaces with optical components including the prism structure, while the second side 102b interfaces with the microfluidics components that contain and deliver the target analyte samples. The positioning of the first side 102a and second side 102b on opposite surfaces of the sensor plate 102 enables the sensor plate 102 to function as the central interface between the optical detection system and the sample delivery system. The sensor plate 102 maintains structural integrity while supporting the thin film layers that provide the surface plasmon resonance functionality. The separation between the first side 102a and second side 102b is maintained at dimensions that optimize optical transmission while providing adequate mechanical support for the attached components.

The sensor plate 102 includes a quartz glass substrate 108. The quartz glass substrate 108 provides the base material for the sensor plate 102 and provides specific optical and mechanical properties required for surface plasmon resonance applications. Quartz glass exhibits low optical absorption in the spectral ranges used for surface plasmon resonance measurements, typically in the visible and near-infrared wavelengths from about 600 nm to about 800 nm. The quartz glass substrate 108 has a refractive index that creates appropriate optical matching conditions with the prism structure and enables efficient coupling of incident laser energy into surface plasmon modes. The mechanical properties of the quartz glass substrate 108 provide dimensional stability under the thermal processing conditions required for copper film annealing. The quartz glass substrate 108 maintains flatness and surface quality that are required for uniform copper film deposition and consistent optical performance. The chemical compatibility of the quartz glass substrate 108 with copper materials prevents interfacial reactions that could degrade sensor performance over time.

The sensor plate 102 further includes a copper film 110 sputtered onto the quartz glass substrate 108 and annealed for about two hours. The copper film 110 provides the plasmonic material that supports surface plasmon resonance and enables target analyte detection through refractive index measurements. The sputtering process deposits the copper film 110 with controlled thickness and composition onto the surface of the quartz glass substrate 108. The sputtering technique provides advantages including flexibility in choice of coating materials, good adhesion between the copper film 110 and the quartz glass substrate 108, high repeatability for consistent film properties, and the ability to deposit thin films on the quartz glass substrate 108 with uniform coverage. The sputtering process utilizes DC power applied to a copper target in an argon atmosphere, with the copper material being ejected from the target and deposited onto the quartz glass substrate 108. The annealing process for about two hours modifies the structural and optical properties of the copper film 110 to achieve specific characteristics required for surface plasmon resonance applications. In the present configuration, annealing temperatures in the range of about 200° C. to about 600° C. transform the as-deposited copper film 110 into various copper oxide phases with different refractive indices, energy band gaps, and surface hydrophobicity characteristics.

The surface plasmon resonance sensor system 100 also includes a quartz prism 112 having a base surface 114 attached to the first side 102a of sensor plate 102. The quartz prism 112 provides the optical coupling mechanism that enables laser energy to interact with the copper film 110 under conditions that generate surface plasmons. The base surface 114 of the quartz prism 112 creates an optical interface with the first side 102a of the sensor plate 102 that maintains the refractive index matching required for efficient energy transfer. The quartz prism 112 is configured with geometric angles that direct incident laser beams toward the copper film 110 at incident angles configured to generate surface plasmons which resonate with the copper film 110. The attachment between the base surface 114 and the first side 102a utilizes optical coupling techniques that minimize interfacial reflections and maintain optical transparency. The quartz prism 112 material selection matches the optical properties of the quartz glass substrate 108 to provide consistent refractive index conditions throughout the optical path. The dimensional stability of the quartz prism 112 maintains consistent incident angles during temperature variations that may occur during sensor operation or copper film processing.

The surface plasmon resonance sensor system 100 further includes a microfluidics unit 116 attached to the second side 102b of the sensor plate 102. Herein, the microfluidics unit 116 includes a fluid reservoir 118 having an inlet port 120 and an outlet port 122. Further, the fluid reservoir 118 contains a carrier fluid 124. The microfluidics unit 116 provides controlled delivery and positioning of target analyte samples in proximity to the copper film 110 for detection purposes. The attachment of the microfluidics unit 116 to the second side 102b positions the fluid reservoir 118 such that the carrier fluid 124 and the target analytes directly contact the surface of the copper film 110. The inlet port 120 enables introduction of target analyte samples into the carrier fluid 124 contained within the fluid reservoir 118. The outlet port 122 provides a flow path for the carrier fluid 124 and enables continuous or batch-wise sample processing depending on the specific detection requirements. The carrier fluid 124 serves as the medium that transports target analytes to surface of the copper film 110 and provides the dielectric environment in which refractive index changes occur upon target analyte binding. The fluid reservoir 118 maintains appropriate sample volumes and provides controlled sample residence times that optimize binding interactions between target analytes and surface-bound binders. The microfluidics unit 116 utilizes materials that are chemically compatible with the carrier fluid 124 and target analyte samples while providing optical transparency for surface plasmon resonance measurements.

The surface plasmon resonance sensor system 100 further includes a target analyte reservoir 126 containing a target analyte 128. The target analyte reservoir 126 provides storage and supply of the target analyte 128 that is to be detected by the surface plasmon resonance sensor system 100. The target analyte 128 represents the specific chemical or biological species of interest that the sensor system is designed to detect and quantify. The target analyte 128 may include various molecular species such as proteins, nucleic acids, small molecules, ions, or other chemical compounds depending on the specific application requirements. The target analyte reservoir 126 maintains the target analyte 128 under controlled conditions that preserve its chemical integrity and binding activity prior to introduction into the microfluidics unit 116. The volume capacity of the target analyte reservoir 126 is configured to provide adequate sample quantities for the intended detection measurements while minimizing sample waste.

The surface plasmon resonance sensor system 100 further includes a pump 130 connected between the target analyte reservoir 126 and the inlet port 120. The pump 130 is configured to inject the target analyte 128 into the microfluidics unit 116 through the inlet port 120. The pump 130 provides controlled delivery of the target analyte 128 from the target analyte reservoir 126 to the microfluidics unit 116 with required flow rate and timing control. The connection between the pump 130 and the target analyte reservoir 126 utilizes fluid coupling mechanisms that maintain sample integrity and prevent contamination during transfer. The pump 130 is configured to inject the target analyte 128 through the inlet port 120 at flow rates that optimize binding interactions with surface-bound binders while maintaining controlled sample residence times. The pump 130 operation may be controlled to provide continuous flow, pulsed delivery, or batch-wise sample introduction depending on the specific detection protocol requirements. The pump 130 may be designed to accommodate the physical and chemical properties of the target analyte 128 and the carrier fluid 124, to ensure reliable sample delivery without degradation or loss of detection capability.

The surface plasmon resonance sensor system 100 further includes a binder 132 attached to the copper film 110. Herein, the binder 132 is configured to attach to the target analyte 128. The binder 132 provides the molecular recognition element that enables specific detection of the target analyte 128 through binding interactions that occur at the surface of the copper film 110. The attachment of the binder 132 to the copper film 110 utilizes chemical or physical binding mechanisms that maintain the binder 132 in fixed positions on surface of the copper film 110 while preserving its binding activity for the target analyte 128. The binder 132 is configured to attach to the target analyte 128 through specific molecular interactions such as antigen-antibody binding, nucleic acid hybridization, or other recognition mechanisms depending on the nature of the target analyte 128. The binding interaction between the binder 132 and the target analyte 128 results in formation of surface-bound complexes that modify the local refractive index in the vicinity of the copper film 110. The density and distribution of the binder 132 on the surface of the copper film 110 are controlled to optimize binding capacity while maintaining accessibility for target analyte 128 molecules in the carrier fluid 124. The stability of the binder 132 attachment to the copper film 110 is maintained under the operating conditions of the surface plasmon resonance sensor system 100 including exposure to the carrier fluid 124 and temperature variations.

In an aspect of the present disclosure, the binder 132 is a ligand selected from a group comprising a NTA-Ni2+-His6 complex, a biotin-streptavidin combination, an aldehyde and a protein. The selection of specific ligand types for the binder 132 enables targeted detection of corresponding analytes through highly specific molecular recognition mechanisms. The NTA-Ni2+-His6 complex provides a metal-chelation based binding system where the nickel-nitrilotriacetic acid complex specifically binds to histidine-tagged proteins, antibodies, or peptides that may serve as target analytes 128. This binding mechanism enables capture of antibodies and almost any proteins including membrane proteins via tags and can also detect cells and viruses as target analytes 128. The biotin-streptavidin combination represents one of the strongest non-covalent biological interactions and provides a highly stable binding platform for detection of the target analyte 128. Streptavidin protein attached to surface of the copper film 110 provides multiple biotin binding sites and enables detection of proteins, antibodies, glycoproteins, peptides, and oligonucleotides as target analytes 128. The biotin-streptavidin coupling provides oriented coupling that retains the ligand activity and structure and provides regenerable binding surfaces, though the capturing system can sometimes interfere with the function or binding site of the ligand and may produce smaller signals with potential non-specific interactions. Protein A/G binders attached to surface of the copper film 110 specifically capture antibodies as target analytes 128 through high-affinity binding interactions. Aldehyde functional groups attached to surface of the copper film 110 provide reactive sites for covalent attachment of primary amine-containing target analytes 128 through Schiff base formation reactions. The aldehyde binder chemistry enables direct immobilization of proteins, peptides, and other amine-containing molecules onto surface of the copper film 110 during the detection process. Hydrophobic surface modifications of the copper film 110 enable detection of vesicles and liposomes as target analytes 128 through hydrophobic interactions that retain these membrane-based structures on the sensor surface.

The surface plasmon resonance sensor system 100 further includes a laser 134 configured to transmit a laser beam 136*a* into a face of the quartz prism 112 at an incident angle configured to generate surface plasmons which resonate with the copper film 110 and reflect a phase shifted laser beam 136*b* from the copper film 110. The laser 134 provides the optical energy source that excites surface plasmon modes at the interface between the copper film 110 and the carrier fluid 124 containing target analytes 128. The laser beam 136*a* is transmitted into the face of the quartz prism 112 at controlled incident angles that satisfy the resonance conditions for surface plasmon excitation at interface of the copper film 110. The incident angle is configured based on the refractive indices of the quartz prism 112, the copper film 110, and the carrier fluid 124 to achieve optimal coupling between the laser beam 136*a* and surface plasmon modes. In the present disclosure, the laser 134 operates at spectral wavelengths in a range of about 600 nm to about 800 nm, which corresponds to the visible and near-infrared regions where the copper film 110 exhibits strong plasmonic response.

In the surface plasmon resonance sensor system 100, the interaction between the laser beam 136*a* and the copper film 110 generates surface plasmons which resonate with the copper film 110 under specific geometric and optical conditions. Surface plasmons are coherent oscillations of conduction electrons at the interface between the copper film 110 and the dielectric medium formed by the carrier fluid 124. The resonance condition occurs when the wave vector of the incident laser beam 136*a* matches the wave vector of the surface plasmon modes supported by interface of the copper film 110. The thickness of the copper film 110, which is about 40 nm, is selected to provide maximum surface plasmon excitation efficiency at the operating wavelengths of the laser 134. The resonance condition is highly sensitive to changes in the refractive index of the carrier fluid 124, which occur when the target analytes 128 bind to the binder 132 attached to surface of the copper film 110. The surface plasmon resonance results in strong absorption of energy of the incident laser beam 136*a*, leading to a characteristic minimum in the reflected intensity at the resonance angle.

The surface plasmon resonance generates the phase shifted laser beam 136*b* that is reflected from the copper film 110 with modified optical properties compared to the incident laser beam 136*a*. The phase shift in the reflected laser beam 136*b* results from the interaction between the incident optical field and the surface plasmon modes at interface of the copper film 110. The magnitude and direction of the phase shift depend on the specific resonance conditions, including the incident angle, wavelength, and refractive index of the carrier fluid 124. When the target analytes 128 attach to the binder 132, the local refractive index at surface of the copper film 110 changes, which modifies the surface plasmon resonance conditions and results in a corresponding change in the phase shift of the reflected laser beam 136*b*. The phase shifted laser beam 136*b* carries information about the presence and concentration of target analytes 128 through its modified optical characteristics. The detection and analysis of the phase shifted laser beam 136*b* enables quantitative determination of the target analyte 128 concentrations in the sample.

Further, as illustrated, the surface plasmon resonance sensor system 100 includes receive optics 142 configured to receive the phase shifted laser beam 136*b*. The receive optics 142 provide optical collection and conditioning of the phase shifted laser beam 136*b* to enable subsequent detection and analysis by downstream components. The receive optics 142 are positioned and aligned to capture the phase shifted laser beam 136*b* that is reflected from the copper film 110 at the resonance angle. The optical design of the receive optics 142 accounts for the angular distribution and intensity characteristics of the phase shifted laser beam 136*b* to ensure efficient collection of the optical signal. The receive optics 142 may include focusing elements, beam conditioning optics, and optical filters that optimize the signal-to-noise ratio and spectral characteristics of the collected light. The receive optics 142 maintain optical alignment and stability during operation to ensure consistent collection efficiency and measurement repeatability.

In particular, the configuration of the sensor with the receive optics 142 accommodates the angular variations in the phase shifted laser beam 136*b* that occur as the surface plasmon resonance conditions change in response to binding of the target analyte 128. The numerical aperture and field of view of the receive optics 142 are selected to capture the phase shifted laser beam 136b over the range of resonance angles that correspond to the expected concentration range of the target analyte 128. The receive optics 142 may incorporate appropriate anti-reflection coatings and optical materials that minimize signal loss and maintain high transmission efficiency at the operating wavelengths of the laser 134. Further, mechanical mounting and alignment of the receive optics 142 are designed to provide stability against environmental factors such as temperature variations and mechanical vibrations that could affect measurement accuracy. The receive optics 142 interface with subsequent optical components through standardized optical coupling mechanisms that maintain signal integrity and enable modular system configuration.

The surface plasmon resonance sensor system 100 further includes a charge coupled device 144 (as shown in FIG. 2) coupled to the receive optics 142. The charge coupled device 144 is configured to convert the phase shifted laser beam 136b to an electrical signal. The charge coupled device 144 provides photoelectric conversion of the optical signal carried by the phase shifted laser beam 136b into electrical signals that can be processed by electronic systems. The coupling between the charge coupled device 144 and the receive optics 142 utilizes optical interfaces that direct the phase shifted laser beam 136b onto the active area of the charge coupled device 144 with appropriate beam conditioning and focusing. The charge coupled device 144 is configured to convert the intensity variations in the phase shifted laser beam 136b into corresponding electrical signal variations that preserve the information content related to detection of the target analyte 128. In some cases, the spectral response of the charge coupled device 144 is matched to the operating wavelength range of the laser 134 to ensure efficient photoelectric conversion. The charge coupled device 144 operates with sufficient sensitivity and dynamic range to detect the signal variations that correspond to concentrations of interest for the target analyte 128.

The charge coupled device 144 incorporates readout electronics and signal conditioning circuits that convert the photogenerated charge into the electrical signal with appropriate amplification and noise reduction. The temporal response of the charge coupled device 144 is selected to accommodate the measurement time scales required for detection of the target analyte 128. The charge coupled device 144 is designed to provide an adequate signal-to-noise ratio for detection of the small signal changes that occur during binding events of the target analyte 128. The electrical signal output from the charge coupled device 144 maintains linear response characteristics over the expected range of optical signal variations to ensure accurate quantitative measurements.

The surface plasmon resonance sensor system 100 further includes a computing unit 150 including an electrical circuitry, a memory storing program instructions and at least one processor configured to execute the program instructions. The computing unit 150 is configured to receive the electrical signal and compute a refractive index based on the phase shift at resonance, where a change in the refractive index is configured to indicate detection of the target analyte 128. The computing unit 150 provides the data processing and analysis capabilities required to convert the electrical signal from the charge coupled device 144 into quantitative measurements of concentration of the target analyte 128. The electrical circuitry within the computing unit 150 includes analog-to-digital conversion circuits, signal conditioning electronics, and input/output interfaces that enable communication with the charge coupled device 144 and other system components. The details regarding hardware and software configurations of the computing unit 150 are discussed in detail below with respect to FIGS. 16-19.

In the surface plasmon resonance sensor system 100, the computing unit 150 is configured to receive the electrical signal and compute a refractive index based on the phase shift. Herein, a change in the refractive index between an unloaded sensor plate 102 and a loaded sensor plate 102 undergoing surface plasmon resonance is configured to indicate detection of the target analyte 128. The computing unit 150 receives the electrical signal through appropriate interface circuits that maintain signal integrity and provide necessary signal conditioning for subsequent digital processing. The electrical signal contains information about the phase shift in the reflected laser beam 136b, which corresponds to changes in the surface plasmon resonance conditions caused by binding events of the target analyte 128. The computing unit 150 processes the electrical signal using digital signal processing techniques that extract the phase shift information and convert the phase shift information to corresponding refractive index measurements. The refractive index calculations account for the optical properties of the copper film 110, the quartz prism 112, and the carrier fluid 124 to determine the local refractive index changes at surface of the copper film 110. In present implementations, the computing unit 150 may maintain calibration data and reference measurements that enable accurate conversion of the electrical signal to absolute refractive index values.

The computing unit 150 determines that a change in the refractive index indicates detection of the target analyte 128 through comparison with baseline measurements and predetermined detection thresholds. The baseline refractive index measurements are established during system calibration using the carrier fluid 124 without the target analytes 128 (an unloaded state) to define the reference conditions. Changes in the refractive index above the detection threshold indicate binding of the target analytes 128 to the binder 132 (a loaded state) and correspond to the presence of target analytes 128 in the sample. The magnitude of the refractive index change correlates with the concentration of the target analytes 128 based on predetermined calibration relationships. The computing unit 150 generates output data that includes both qualitative detection results and quantitative concentration measurements. The computing unit 150 may also provide additional analysis functions such as binding kinetics analysis, multi-analyte detection, and statistical analysis of measurement results.

In some examples, as shown in FIG. 2, the surface plasmon resonance sensor system 100 further includes a polarizer 152 configured to polarize the laser beam 136a to a specific polarization state before entering the quartz prism 112, ensuring optimal coupling conditions for surface plasmon excitation at the copper film 110 interface. The surface plasmon resonance sensor system 100 also includes an optical fiber coupler 154 coupled to the receive optics 142 for efficiently directing the collected phase shifted laser beam 136b through an optical fiber 158 to downstream detection components while maintaining signal integrity and minimizing optical losses during transmission. Additionally, the surface plasmon resonance sensor system 100 includes a grating 156 positioned before the charge coupled device 144 for dispersing the phase shifted laser beam 136b into its constituent spectral components, enabling wavelength-specific analysis of the surface plasmon resonance conditions and providing enhanced spectral resolution for precise determination of refractive index changes corresponding to target analyte 128 binding events.

In an aspect of the present disclosure, the surface plasmon resonance sensor system 100 further includes a sputtering Coater 160 configured to sputter the copper film 110 onto the quartz glass substrate 108, and a tubular furnace 162 configured to anneal the sensor plate 102 for the about two hours at a temperature in a range of about 200° C. to about 600° C. to form an annealed copper film. FIG. 3A is a schematic diagram illustrating a first step of fabricating the copper film 110 by direct current (DC) sputtering process onto the quartz glass substrate 108. The sputtering Coater 160 provides controlled deposition of the copper film 110 with thickness control and uniform coverage across the surface of the quartz glass substrate 108. The sputtering Coater 160 utilizes DC power applied to a copper target in an argon atmosphere, with process parameters including chamber pressure, gas flow rate, and deposition power that determine the film properties. The sputtering Coater 160 maintains the target substrate distance at about 10 cm to achieve optimal film uniformity and deposition rate. The base pressure and working pressure in the sputtering chamber are maintained at approximately $1.7 \times 10^{-5}$ torr and $2.8 \times 10^{-3}$ torr respectively to ensure high-quality film deposition. The argon flow rate in the chamber is kept at about 30 SCCM during the deposition to maintain stable plasma conditions and consistent deposition rates. FIG. 3B is a schematic diagram illustrating a second step of annealing the copper film 110 at elevated temperatures. The tubular furnace provides controlled thermal processing of the deposited copper film 110 to transform it into the annealed copper film with specific optical and surface properties. The tubular furnace operates in the temperature range of about 200° C. to about 600° C. with temperature control and uniform heating of the sensor plate 102. The annealing process for about two hours at controlled temperatures modifies the microstructure, surface morphology, and chemical composition of the copper film 110. The tubular furnace utilizes a controlled atmosphere that may include air, inert gas, or reducing gas depending on the desired final composition of the annealed copper film. The heating rate of about 20° C. per minute and controlled cooling rate ensure reproducible transformation for properties of the copper film 110. The tubular furnace processing results in formation of various copper oxide phases including $Cu_2O$ and CuO depending on the specific annealing temperature and atmosphere conditions.

In an aspect of the present disclosure, the annealed copper film has a thickness of about 40 nm and is configured to resonate when a spectral wavelength of the laser beam 136a is in a range of about 600 nm to about 800 nm (as discussed below with experimental examples). The thickness of about 40 nm for the annealed copper film represents an optimized value that provides maximum surface plasmon resonance efficiency for the specified wavelength range. The annealed copper film at about 40 nm thickness exhibits minimum reflectance at the resonance angles, indicating optimal conversion of incident laser beam 136a energy into surface plasmon modes. This thickness optimization is based on the penetration depth of the surface plasmon modes and the optical properties of the annealed copper film after thermal processing. The annealed copper film is configured to resonate when the spectral wavelength of the laser beam 136a is in the range of about 600 nm to about 800 nm, which corresponds to the visible red and near-infrared regions of the electromagnetic spectrum. This wavelength range provides an optimal plasmonic response for copper-based materials and enables efficient surface plasmon excitation. The wavelength dependence of the surface plasmon resonance conditions determines the specific incident angles required for resonance at each wavelength. At 600 nm wavelength, the annealed copper film in the unloaded state exhibits resonance at an incident angle of about 44.7°, while at 700 nm and 800 nm wavelengths, the resonance angles are about 42.7° and about 42.15° respectively (as discussed below with experimental examples).

For these purposes, the copper film 110 is annealed at a temperature of about 200° C. The annealing temperature of about 200° C. results in the formation of Cu-based oxide islands on the surface of the as-grown copper film 110 without complete oxidation of the bulk material. This temperature treatment initiates the early stage of nano-crystalline Cu-based oxide film formation, particularly $Cu_2O$ at the surface of the amorphous copper film 110. The controlled oxidation at about 200° C. creates a surface layer with modified optical and wetting properties while preserving the underlying copper substrate for plasmonic applications. The annealing time of about two hours at about 200° C. provides sufficient thermal energy for surface reconstruction and oxide formation without excessive oxidation that would degrade the plasmonic properties.

When annealed at about 200° C., the copper film 110 has a refractive index of about 2.85, an energy band gap $E_g$ of 2.38 eV and a hydrophobic surface with a wetting contact angle of 92.4° (as discussed below with experimental examples). The refractive index of about 2.85 for the copper film 110 annealed at about 200° C. reflects the optical properties of the partially oxidized surface layer combined with the underlying metallic copper substrate. This refractive index value is intermediate between pure metallic copper and fully oxidized copper oxide phases, indicating the mixed composition achieved through controlled low-temperature annealing. The energy band gap $E_g$ of 2.38 eV corresponds to the optical absorption edge of the Cu-based oxide phase formed during the 200° C. annealing treatment. This energy band gap value indicates the presence of $Cu_2O$-like electronic structure in the surface region of the annealed copper film 110. The band gap measurement is obtained through UV-vis absorption spectroscopy and Tauc plot analysis that extracts the optical transition energy. The hydrophobic surface with a wetting contact angle of 92.4° represents a significant modification of the surface wetting properties compared to the as-deposited copper film 110. The increase in contact angle from about 71.9° for the pristine copper film 110 to 92.4° after annealing at about 200° C. indicates enhanced hydrophobic character due to surface roughening and chemical composition changes. The hydrophobic surface properties result from the combination of modified surface chemistry and topographical changes that occur during the thermal treatment. The wetting contact angle measurement is performed using sessile drop tests with deionized water droplets on surface of the annealed copper film 110. The hydrophobic surface characteristics provide advantages for sensor applications where reduced water adsorption and improved chemical stability are desired.

In an aspect of the present disclosure, the copper film 110 is annealed at a temperature of about 400° C. for the about two hours and is converted to an annealed cuprous oxide film (as discussed later with experimental examples). The annealing temperature of about 400° C. provides sufficient thermal energy to achieve more complete oxidation of the copper film 110 compared to the 200° C. treatment. The annealed cuprous oxide film represents a nano-crystalline $Cu_2O$ thin film formed through controlled thermal oxidation of the original copper film 110. The transformation from metallic copper to cuprous oxide occurs through inward diffusion of oxygen and outward diffusion of copper at the elevated temperature. The annealing time of about two hours at about 400° C. ensures complete conversion of the copper film 110 to the cuprous oxide phase throughout the film thickness. The annealed cuprous oxide film maintains the structural integrity and uniform thickness of the original copper film 110 while exhibiting modified optical and surface properties.

In an aspect of the present disclosure, the annealed cuprous oxide film has a refractive index of about 3.05, an energy band gap $E_g$ of 1.69 eV and a hydrophobic surface with a wetting contact angle of 85.2° (as discussed below with experimental examples). The refractive index of about 3.05 for the annealed cuprous oxide film is higher than the partially oxidized copper film 110 and reflects the optical properties of the $Cu_2O$ crystalline phase. This refractive index value is consistent with reported values for cuprous oxide and indicates complete transformation from the metallic copper phase. The energy band gap $E_g$ of 1.69 eV corresponds to the characteristic band gap of $Cu_2O$ and confirms the formation of the cuprous oxide phase through the 400° C. annealing treatment. This band gap value enables optical absorption in the visible region and contributes to the surface plasmon resonance characteristics of the annealed cuprous oxide film. Herein, the hydrophobic surface with a wetting contact angle of 85.2° maintains the hydrophobic character established during lower temperature annealing while showing a slight decrease compared to the 200° C. treatment. The wetting contact angle of 85.2° results from the balance between surface chemistry effects and topographical modifications that occur during the higher temperature annealing process. The annealed cuprous oxide film exhibits clusters and voids in the surface morphology that influence the wetting behavior according to the Wenzel theory where surface roughness contributes to wettability characteristics. The hydrophobic properties of the annealed cuprous oxide film provide benefits for sensor applications including reduced non-specific binding and improved chemical stability in aqueous environments.

In an aspect of the present disclosure, the copper film 110 is annealed at a temperature of about 600° C. for the about two hours and is converted to an annealed copper oxide film 166 (as discussed later with experimental examples). The annealing temperature of about 600° C. represents a high-temperature thermal treatment that achieves complete oxidation of the copper film 110 to the higher oxidation state copper oxide phase. The annealed copper oxide film 166 corresponds to the CuO phase that forms through complete oxidation of the original copper film 110 at the elevated temperature. The transformation from $Cu_2O$ to CuO occurs through continued oxygen diffusion and oxidation reactions that convert the cuprous oxide to cupric oxide at the 600° C. annealing temperature. The annealing time of about two hours at about 600° C. ensures complete conversion throughout the film thickness and establishes the thermodynamically stable CuO phase. The annealed copper oxide film 166 exhibits modified surface morphology with increased surface roughness compared to lower temperature treatments. The formation of the annealed copper oxide film 166 involves structural changes that affect both the optical properties and surface characteristics of the material. The high-temperature annealing process results in grain growth and surface restructuring that creates clusters and voids in the film morphology. The annealed copper oxide film 166 maintains the overall film thickness and substrate adhesion while exhibiting significantly modified surface topography. The conversion to the CuO phase is accompanied by changes in the electronic structure that influence the optical absorption and plasmonic properties. The annealed copper oxide film 166 represents the fully oxidized state of the original copper film 110 and provides different surface plasmon resonance characteristics compared to the metallic copper or $Cu_2O$ phases.

In an aspect of the present disclosure, the annealed copper oxide film 166 has a refractive index of about 3.11, an energy band gap $E_g$ of 1.54 eV and a hydrophobic surface with a wetting contact angle of 42.3° (as discussed later with experimental examples). The refractive index of about 3.11 for the annealed copper oxide film 166 represents the highest value among the different annealing conditions and reflects the optical properties of the CuO crystalline phase. This refractive index value is consistent with reported values for cupric oxide and indicates complete transformation from the lower oxidation states. The energy band gap $E_g$ of 1.54 eV corresponds to the characteristic band gap of CuO and confirms the formation of the cupric oxide phase through the 600° C. annealing treatment. This band gap value enables optical absorption in the visible region and contributes to the surface plasmon resonance characteristics of the annealed copper oxide film 166. The reduced band gap compared to $Cu_2O$ reflects the different electronic structure of the CuO phase. Herein, the wetting contact angle of 42.3° for the annealed copper oxide film 166 represents a significant decrease in hydrophobicity compared to the lower temperature annealing conditions. The reduced contact angle indicates a transition from hydrophobic to more hydrophilic surface characteristics due to the combined effects of surface chemistry changes and morphological modifications. The surface morphology of the annealed copper oxide film 166 exhibits clusters and voids that contribute to increased surface roughness and modified wetting behavior. The formation of the CuO phase introduces different surface chemistry that affects the interaction with water molecules and reduces the hydrophobic character. The transition to more hydrophilic characteristics may be attributed to the increased oxygen content and modified electronic structure of the CuO surface compared to the $Cu_2O$ phase.

In an aspect of the present disclosure, the annealed copper film is configured to resonate when interrogated by the laser beam 136a at a spectral wavelength of about 600 nm and at an incident angle of about 44.7° (as discussed below in experimental examples). The resonance condition at 600 nm wavelength and the 44.7° incident angle represent the optimal coupling between the laser beam 136a and surface plasmon modes supported by the annealed copper film. This specific combination of wavelength and incident angle satisfies the wave vector matching condition required for surface plasmon excitation at the copper film interface. The resonance at 44.7° incident angle for 600 nm wavelength results in minimum reflectance of about 0.0002 arbitrary units, indicating maximum conversion of incident laser energy into surface plasmon modes. The narrow resonance curve with a full width at half maximum of about 3.3° provides high angular sensitivity for refractive index measurements. The resonance characteristics at the 600 nm wavelength enable sensitive detection of binding events of the target analyte 128 through measurement of angular shifts in the surface plasmon resonance condition.

In an aspect of the present disclosure, the annealed copper film is configured to resonate when interrogated by the laser beam 136a at a spectral wavelength of about 700 nm and at an incident angle of about 42.7° (as discussed below in experimental examples). The resonance condition at the 700 nm wavelength and the 42.7° incident angle provides an alternative operating point for the surface plasmon resonance sensor system 100 with different sensitivity characteristics. The incident angle of 42.7° for the 700 nm wavelength results in minimum reflectance of about 0.0097 arbitrary units, indicating efficient surface plasmon excitation. The resonance curve at the 700 nm wavelength exhibits a full width at half maximum of about 0.816°, which is narrower than the 600 nm condition and provides enhanced angular resolution for refractive index measurements. The blue-shift in resonance angle from 44.7° to 42.7° as the wavelength increases from 600 nm to 700 nm follows the expected dispersion characteristics of the annealed copper film. The resonance at the 700 nm wavelength provides advantages for certain applications where a longer wavelength is needed to provide reduced optical absorption in biological samples or improved penetration through optical components.

In an aspect of the present disclosure, the annealed copper film is configured to resonate when interrogated by the laser beam 136a at a spectral wavelength of about 800 nm and at an incident angle of about 42.15° (as discussed below with experimental examples). The resonance condition at 800 nm wavelength and 42.15° incident angle represents the longest wavelength operating point for the surface plasmon resonance sensor system 100 within the specified range. The incident angle of 42.15° for 800 nm wavelength results in minimum reflectance of about 0.0143 arbitrary units, maintaining efficient surface plasmon excitation in the near-infrared region. The resonance curve at 800 nm wavelength exhibits a full width at the half maximum of about 0.5°, providing the narrowest resonance among the three wavelength conditions and the highest angular sensitivity. The continued blue-shift in resonance angle to 42.15° as the wavelength increases to 800 nm demonstrates the consistent dispersion behavior of the annealed copper film. The resonance at 800 nm wavelength provides particular advantages for applications requiring deep tissue penetration or reduced scattering in biological samples.

Figure 4:
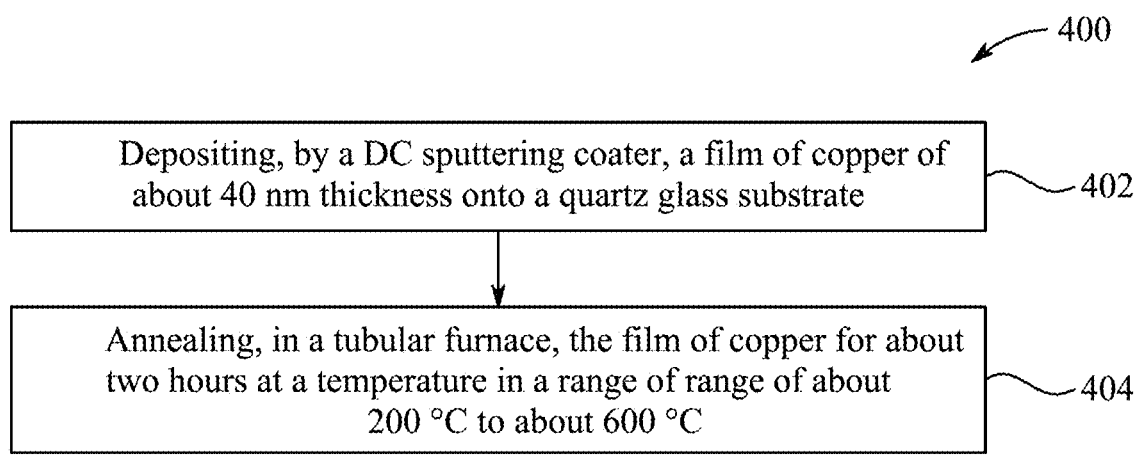
FIG. 4 is an exemplary flowchart of a method for making a surface plasmon resonance sensor plate, according to certain embodiments.

Referring to FIG. 4, illustrated is an exemplary flowchart of a method 400 for making a surface plasmon resonance sensor plate (such as, the sensor plate 102). The method 400 provides a systematic approach for fabricating the sensor plate 102 with controlled copper film properties through sputtering and annealing processes. The method 400 represents a two-step fabrication process where the first step involves copper film deposition and the second step involves thermal treatment to achieve desired optical and surface characteristics. The method 400 enables reproducible fabrication of sensor plates with consistent performance characteristics for surface plasmon resonance applications. The process parameters in the method 400 are optimized to achieve the specific film thickness, composition, and surface properties required for target analyte detection.

At step 402, the method 400 includes depositing, by a DC sputtering Coater 160, a film of copper of about 40 nm thickness onto a quartz glass substrate 108. FIG. 3A illustrates the step of fabricating a copper thin film by DC sputtering process onto a quartz glass substrate. The depositing step utilizes the DC sputtering Coater 160 to create the copper film 110 with controlled thickness and composition on the quartz glass substrate 108. The DC sputtering process involves applying DC power to a copper target in an argon atmosphere, causing copper atoms to be ejected from the target and deposited onto the quartz glass substrate 108. The film thickness of about 40 nm is monitored and controlled using an in-built thickness monitor that terminates the deposition process when the target thickness is achieved. The deposition parameters including chamber pressure, gas flow rate, target-substrate distance, and deposition power are optimized to achieve uniform film coverage and desired film properties.

In the present configuration, the DC sputtering coater 160 maintains specific process conditions during the depositing step to ensure high-quality film formation. The base pressure in the sputtering chamber is maintained at approximately $1.7 \times 10^{-5}$ torr to minimize contamination and ensure clean deposition conditions. The working pressure during copper sputtering is maintained at about $2.8 \times 10^{-3}$ torr in argon atmosphere to establish stable plasma conditions for consistent deposition rates. The argon gas flow rate is controlled at about 30 SCCM to maintain the desired chamber pressure and provide appropriate sputtering gas for the deposition process. The target-substrate distance is maintained at about 10 cm to optimize film uniformity and deposition rate while minimizing substrate heating during the process. The DC power applied to the copper target is controlled to achieve the desired deposition rate while maintaining film quality and substrate temperature within acceptable ranges.

At step 404, the method 400 includes annealing, in a tubular furnace 162, the film of copper for about two hours at a temperature in a range of about 200° C. to about 600° C. FIG. 3B illustrates the step of annealing the copper thin film at elevated temperatures. The annealing step transforms the as-deposited copper film 110 into various copper oxide phases with modified optical and surface properties depending on the specific temperature within the specified range. The tubular furnace 162 provides controlled thermal processing with temperature control and uniform heating of the sensor plate 102. The annealing time of about two hours ensures complete transformation of structure and composition of the copper film 110 while maintaining film integrity and substrate adhesion. The temperature range of about 200° C. to about 600° C. encompasses the conditions required to achieve different copper oxide phases including $Cu_2O$ and CuO with varying optical and surface characteristics. The annealing process modifies the surface morphology, refractive index, energy band gap, and hydrophobic properties of the copper film 110 to optimize performance for surface plasmon resonance applications.

In the present configuration, the annealing process in the tubular furnace 162 utilizes controlled heating and cooling rates to achieve reproducible film transformation. The heating rate of about 20° C. per minute provides a gradual temperature increase that minimizes thermal stress and prevents film cracking or delamination of the copper film from the quartz glass substrate 108. The annealing atmosphere within the tubular furnace 162 may be controlled to achieve specific oxidation conditions, typically using ambient air for oxidation or inert gas for maintaining reduced conditions. The temperature uniformity within the tubular furnace 162 ensures consistent processing across the entire sensor plate 102 area and enables reproducible film properties. The cooling rate after annealing is controlled to prevent thermal shock and maintain the desired crystalline structure of the transformed copper oxide phases. The annealing process results in formation of annealed copper film, annealed cuprous oxide film, or annealed copper oxide film 166 depending on the specific temperature conditions within the specified range.

In an aspect of the present disclosure, the method 400 includes annealing, in the tubular furnace 162, the film of copper for about two hours at a temperature of about 200° C. to form an annealed copper film with a refractive index of about 2.85, an energy band gap $E_g$ of 2.38 eV and a hydrophobic surface with a wetting contact angle of 92.4°. The specific annealing temperature of about 200° C. provides controlled partial oxidation of the copper film 110 that results in formation of Cu-based oxide islands on the surface while maintaining the primarily metallic copper composition. The annealing time of about two hours at about 200° C. ensures sufficient thermal treatment to achieve the desired surface modifications and optical properties. The resulting annealed copper film exhibits enhanced hydrophobic characteristics compared to the as-deposited copper film 110, which provides advantages for sensor applications where reduced water adsorption is desired. The optical properties including the refractive index of about 2.85 and energy band gap of 2.38 eV are optimized for surface plasmon resonance applications in the visible wavelength range. The controlled annealing conditions enable reproducible formation of the annealed copper film with consistent properties for sensor fabrication.

In an aspect of the present disclosure, the method 400 includes annealing, in the tubular furnace 162, the film of copper for about two hours at a temperature of about 400° C. to transform the film of copper into an annealed cuprous oxide film with a refractive index of about 3.05, an energy band gap $E_g$ of 1.69 eV and a hydrophobic surface with a wetting contact angle of 85.2°. The annealing temperature of about 400° C. provides sufficient thermal energy to achieve more complete oxidation of the copper film 110 compared to treatment at 200° C., resulting in transformation to the cuprous oxide phase. The annealing time of about two hours at about 400° C. ensures complete conversion throughout the film thickness and establishes the $Cu_2O$ crystalline phase. The annealed cuprous oxide film maintains hydrophobic surface characteristics with a wetting contact angle of 85.2°, which provides benefits for sensor applications including reduced non-specific binding. The optical properties including the refractive index of about 3.05 and the energy band gap of 1.69 eV correspond to the characteristic values for $Cu_2O$ and enable effective surface plasmon resonance in the specified wavelength range. The transformation to cuprous oxide provides modified plasmonic properties compared to metallic copper while maintaining suitable characteristics for target analyte detection.

Figure 5:
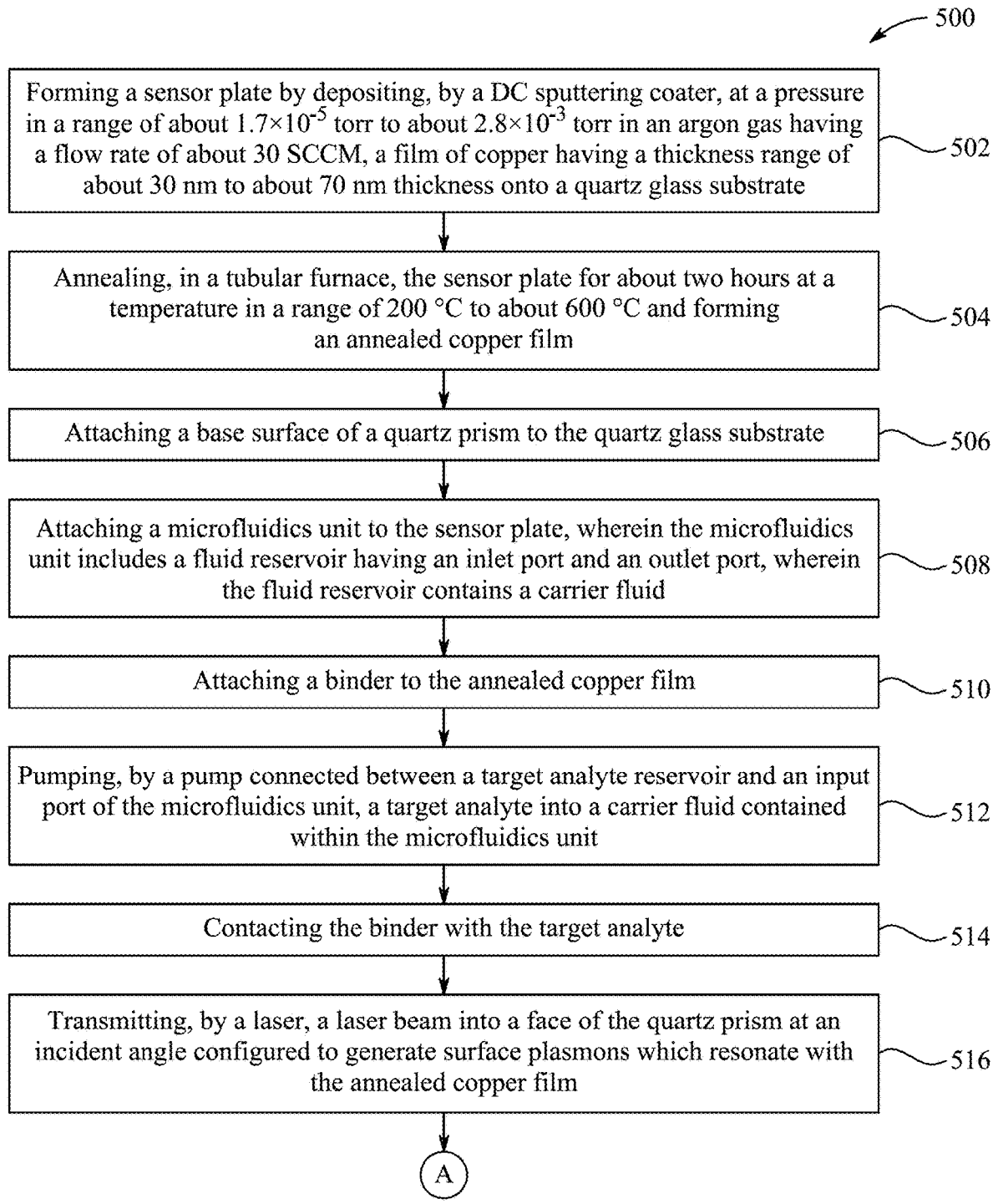
FIG. 5 is an exemplary flowchart of a method for making a surface plasmon resonance sensor, according to certain embodiments.
Figure 5:
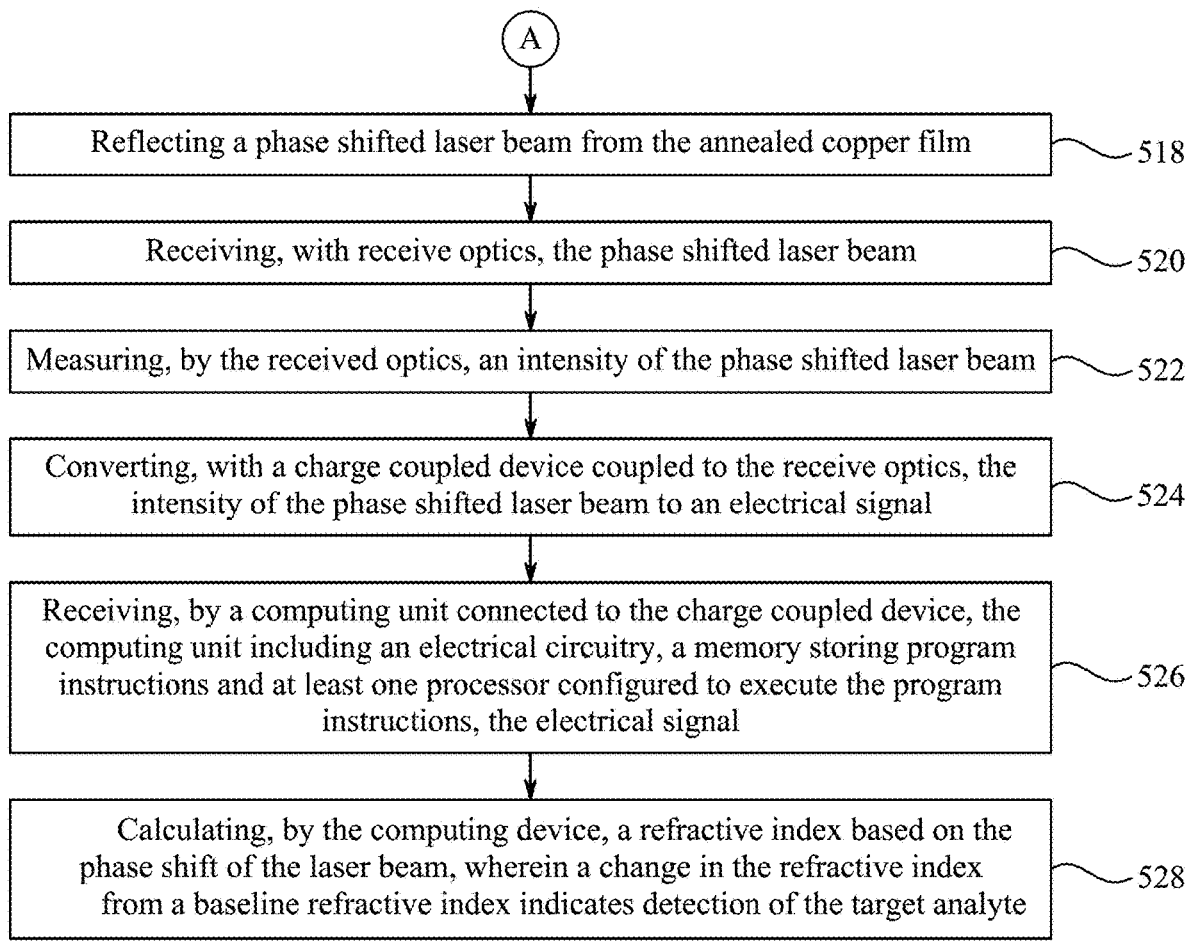

Referring to FIG. 5, illustrated is an exemplary flowchart of a method 500 for making a surface plasmon resonance sensor including sensor plate formation, component attachment, and detection procedures. The method 500 provides a fabrication and operation procedure that encompasses all aspects of creating and using the surface plasmon resonance sensor system 100 for target analyte detection. The method 500 integrates the sensor plate fabrication steps with the assembly of optical components, microfluidics, and detection electronics to create a complete functional sensor system. The method 500 includes calibration and measurement procedures that enable quantitative detection of target analytes through refractive index measurements. The systematic approach of the method 500 ensures reproducible sensor performance and reliable target analyte detection capabilities.

At step 502, the method 500 includes forming a sensor plate 102 by depositing, by a DC sputtering coater, at a pressure in a range of about $1.7 \times 10^{-5}$ torr to about $2.8 \times 10^{-3}$ torr in an argon gas having a flow rate of about 30 SCCM, a film of copper having a thickness range of about 30 nm to about 70 nm thickness onto the quartz glass substrate 108. The forming of the sensor plate 102 utilizes controlled sputtering conditions that ensure high-quality copper film deposition with uniform coverage and desired thickness. The given pressure range encompasses the base pressure and working pressure conditions that provide optimal sputtering performance. The base pressure of about $1.7 \times 10^{-5}$ torr ensures clean deposition conditions with minimal contamination, while the working pressure of about $2.8 \times 10^{-3}$ torr in argon provides stable plasma conditions for consistent copper deposition. The argon gas flow rate of about 30 SCCM maintains the desired chamber pressure and provides appropriate sputtering gas for uniform target erosion and film deposition. The copper film thickness range of about 30 nm to about 70 nm enables optimization of the surface plasmon resonance characteristics for different applications, with about 40 nm representing the optimal thickness for maximum resonance efficiency.

The deposition process utilizes DC power applied to a high-purity copper target to generate the sputtering plasma and copper atom ejection. The target-substrate distance is maintained at appropriate values to ensure uniform film deposition across the quartz glass substrate 108. The deposition rate is controlled through adjustment of the DC power and chamber pressure to achieve consistent film thickness and properties. The quartz glass substrate 108 provides a foundation for copper film deposition with compatible thermal expansion characteristics and optical properties for subsequent surface plasmon resonance applications. This step results in the creation of the sensor plate 102 with the copper film 110 that serves as the foundation for subsequent thermal treatment and surface plasmon resonance functionality.

At step 504, the method 500 includes annealing, in a tubular furnace 162, the sensor plate 102 for about two hours at a temperature in a range of 200° C. to about 600° C. and forming an annealed copper film. The annealing step transforms the as-deposited copper film 110 into various copper oxide phases with modified optical and surface properties that are optimized for surface plasmon resonance applications. The given temperature range provides control over the degree of oxidation and the specific copper oxide phase that is formed during the thermal treatment. The annealing time of about two hours ensures complete transformation of structure and composition of the copper film 110 while maintaining film integrity and adhesion to the quartz glass substrate 108. The tubular furnace 162 provides uniform temperature distribution and controlled heating and cooling rates to achieve reproducible film transformation. The forming of the annealed copper film results in modified refractive index, energy band gap, surface morphology, and hydrophobic properties compared to the as-deposited copper film 110.

At step 506, the method 500 includes attaching the base surface 114 of the quartz prism 112 to the quartz glass substrate 108. This creates the optical interface between the quartz prism 112 and the sensor plate 102 that enables laser beam coupling and surface plasmon excitation. The base surface 114 of the quartz prism 112 is positioned in direct contact with the first side 102a of the sensor plate 102 to minimize optical losses and maintain consistent refractive index matching. The attachment utilizes optical coupling techniques that may include index-matching fluids, optical adhesives, or direct optical contact to achieve efficient light transmission between the quartz prism 112 and the quartz glass substrate 108. Geometry of the quartz prism 112 is selected to provide appropriate incident angles for surface plasmon resonance excitation at the annealed copper film interface. The attachment process maintains alignment between the quartz prism 112 and the sensor plate 102 to ensure consistent optical performance and measurement repeatability.

At step 508, the method 500 includes attaching the microfluidics unit 116 to the sensor plate 102, wherein the microfluidics unit 116 includes the fluid reservoir 118 having the inlet port 120 and the outlet port 122, wherein the fluid reservoir 118 contains the carrier fluid 124. The attaching of the microfluidics unit 116 creates the sample delivery and containment system that positions target analytes in proximity to the annealed copper film for detection. The microfluidics unit 116 is attached to the second side 102b of the sensor plate 102 such that the fluid reservoir 118 directly contacts the surface of the annealed copper film. The fluid reservoir 118 provides controlled sample volumes and residence times that optimize binding interactions between target analytes and surface-bound binders. The inlet port 120 and the outlet port 122 enable controlled introduction and removal of samples from the fluid reservoir 118 during detection measurements. The carrier fluid 124 serves as the medium that transports target analytes to the annealed copper film surface and provides the dielectric environment for refractive index measurements.

At step 510, the method 500 includes attaching the binder 132 to the annealed copper film. The attaching of the binder 132 enables specific detection of target analytes through binding interactions at the annealed copper film surface. The binder 132 may be attached through various chemical or physical mechanisms including covalent bonding, physisorption, or specific molecular interactions depending on the nature of the binder and the surface properties of the annealed copper film. The attachment process is performed under controlled conditions that preserve the binding activity of the binder 132 while ensuring stable immobilization on the annealed copper film surface.

At step 512, the method 500 includes pumping, by the pump 130 connected between the target analyte reservoir 126 and an input port of the microfluidics unit 116, the target analyte 128 into the carrier fluid 124 contained within the microfluidics unit 116. The pumping action provides controlled delivery of the target analyte 128 from the target analyte reservoir 126 to the microfluidics unit 116 where binding interactions with the binder 132 can occur. The pump 130 operates with flow rate control to optimize binding kinetics and measurement sensitivity while minimizing sample consumption. The concentration of the target analyte 128 in the carrier fluid 124 is controlled to achieve detectable binding signals while operating within the linear response range of the surface plasmon resonance detection system. It may be understood that the pumping process could be performed in a continuous flow mode or a batch mode depending on the specific detection requirements and sample characteristics.

At step 514, the method 500 includes contacting the binder 132 with the target analyte 128. The contacting step enables the molecular recognition interaction between the binder 132 and the target analyte 128 that forms the basis for detection through refractive index changes. The contacting occurs when the target analyte 128 in the carrier fluid 124 encounters the binder 132 immobilized on the annealed copper film surface. The binding interaction results in formation of surface-bound complexes that modify the local refractive index in the vicinity of the annealed copper film. Herein, the contacting process is controlled through factors including sample concentration, temperature, pH, and binding time to optimize detection sensitivity and specificity.

At step 516, the method 500 includes transmitting, by the laser 134, the laser beam 136a into a face of the quartz prism 112 at an incident angle configured to generate surface plasmons which resonate with the annealed copper film. This provides the optical excitation that generates surface plasmons at the interface between the annealed copper film and the carrier fluid 124 containing bound target analytes. The laser 134 operates at wavelengths in the range of about 600 nm to about 800 nm to achieve optimal surface plasmon excitation with the annealed copper film. The incident angle is configured based on the refractive indices of the system components and the specific resonance conditions for the annealed copper film thickness and composition.

At step 518, the method 500 includes reflecting the phase shifted laser beam 136b from the annealed copper film. The reflecting step generates the optical signal that carries information about the surface plasmon resonance conditions and the refractive index changes caused by binding of the target analyte 128. The phase shifted laser beam 136b results from the interaction between the incident laser beam 136a and the surface plasmon modes at the annealed copper film interface. The magnitude and direction of the phase shift depend on the specific resonance conditions and the local refractive index at the annealed copper film surface. Changes in the phase shift correspond to binding of the target analytes 128 to the binder 132 and enable quantitative detection of target analyte concentrations.

At step 520, the method 500 includes receiving, with the receive optics 142, the phase shifted laser beam 136b. The receive optics 142 are positioned and aligned to efficiently collect the phase shifted laser beam 136b over the range of resonance angles that correspond to the expected concentration range of the target analyte 128. The receive optics 142 maintain optical alignment and collection efficiency during measurements to ensure consistent signal detection and measurement accuracy.

At step 522, the method 500 includes measuring, by the received optics 142, an intensity of the phase shifted laser beam 136b. The measuring step quantifies the optical signal characteristics that correspond to the surface plasmon resonance conditions and target analyte binding levels. The intensity measurement captures variations in the phase shifted laser beam 136b that result from changes in the surface plasmon resonance due to refractive index modifications at the annealed copper film surface. The measurement process accounts for factors including background signals, noise sources, and calibration references to ensure accurate signal quantification.

At step 524, the method 500 includes converting, with the charge coupled device 144 coupled to the receive optics 142, the intensity of the phase shifted laser beam 136b to an electrical signal. This step transforms the optical signal into electrical form for subsequent processing by electronic systems. The charge coupled device 144 provides photoelectric conversion with required sensitivity, dynamic range, and temporal response for the surface plasmon resonance detection application. The electrical signal maintains the information content related to target analyte detection while providing compatibility with electronic processing systems.

At step 526, the method 500 includes receiving, by the computing unit 150 connected to the charge coupled device 144, the computing unit 150 including the electrical circuitry, the memory storing program instructions and the at least one processor configured to execute the program instructions, the electrical signal. This enables data acquisition and processing of the detection signals by the computing unit 150. The computing unit 150 interfaces with the charge coupled device 144 through appropriate signal conditioning and data acquisition circuits that maintain signal integrity and provide necessary amplification and filtering.

At step 528, the method 500 includes calculating, by the computing unit 150, the refractive index based on the phase shift of the laser beam 136a, wherein a change in the refractive index from a baseline refractive index indicates detection of the target analyte 128. The process involves converting the electrical signal into quantitative measurements of refractive index changes that correspond to binding events of the target analyte 128. The computing unit 150 processes the electrical signal using algorithms that account for the optical system parameters and calibration data to determine absolute refractive index values. The comparison with baseline refractive index measurements enables detection of binding of the target analyte 128 and quantification of concentrations of the target analyte 128 in the sample.

In an aspect of the present disclosure, the method 500 further comprises transmitting, by the laser 134, spectral wavelengths in a range of about 600 nm to about 800 nm at incident angles in a range of about 41 degrees to about 50 degrees onto the annealed copper film. The transmitting of said spectral wavelengths provides optimal surface plasmon excitation conditions for the annealed copper film across the visible and near-infrared wavelength regions. This wavelength range corresponds to the spectral region where copper-based materials exhibit strong plasmonic response and efficient surface plasmon coupling. The incident angles in the given range encompass the resonance angles for the specified wavelength range and annealed copper film thickness. The specific incident angle for each wavelength within this range is determined by the surface plasmon dispersion characteristics and the optical properties of the annealed copper film.

In particular, as discussed later with experimental examples, the incident angles within the said range of about 41 degrees to about 50 degrees provide optimal coupling between the laser beam 136a and surface plasmon modes for the annealed copper film thickness of about 40 nm. At 600 nm wavelength, the incident angle of about 44.7 degrees provides minimum reflectance and maximum surface plasmon excitation efficiency. As the wavelength increases to 700 nm and 800 nm, the incident angles decrease to about 42.7 degrees and about 42.15 degrees respectively, following the dispersion characteristics of the annealed copper film. The range of incident angles accommodates variations in the annealed copper film properties that may occur due to processing variations while maintaining effective surface plasmon resonance conditions. The wavelength and angle ranges also enable implementation of multi-wavelength detection schemes that can provide enhanced measurement accuracy and reduced interference effects.

In an aspect of the present disclosure, the method 500 further comprises forming, by sputtering, the film of copper to a thickness of about 40 nm and annealing the sensor plate 102 for the about two hours at a temperature of about 200° C. to form an annealed copper film with a refractive index of about 2.85, an energy band gap $E_g$ of 2.38 eV and a hydrophobic surface with a wetting contact angle of 92.4°. The forming of the copper film 110 to a thickness of about 40 nm provides the optimal thickness for surface plasmon resonance applications with the annealed copper film. This thickness represents the optimized value that provides minimum reflectance and maximum surface plasmon excitation efficiency at the operating wavelengths of about 600 nm to about 800 nm. The annealing at about 200° C. for about two hours provides controlled thermal treatment that transforms the as-deposited copper film 110 into the annealed copper film with specific optical and surface properties. The resulting annealed copper film exhibits a refractive index of about 2.85, which provides appropriate optical constants for surface plasmon resonance in the specified wavelength range. The energy band gap $E_g$ of 2.38 eV corresponds to the optical absorption characteristics of the Cu-based oxide phase formed during annealing. The hydrophobic surface with a wetting contact angle of 92.4° provides enhanced surface properties for sensor applications where reduced water adsorption and improved chemical stability are desired.

In an aspect of the present disclosure, the method 500 further comprises forming, by sputtering, the film of copper to a thickness of about 40 nm and annealing the sensor plate 102 for the about two hours at a temperature of about 400° C. to transform the film of copper to an annealed cuprous oxide film with a refractive index of about 3.05, an energy band gap $E_g$ of 1.69 eV and a hydrophobic surface with a wetting contact angle of 85.2°. The forming of the copper film 110 to a thickness of about 40 nm provides the foundation for transformation to the annealed cuprous oxide film while maintaining the optimal thickness for surface plasmon resonance applications. The annealing at about 400° C. for about two hours provides sufficient thermal energy to achieve complete transformation of the copper film 110 to the cuprous oxide phase. The resulting annealed cuprous oxide film exhibits a refractive index of about 3.05, which is higher than the partially oxidized copper film and provides different surface plasmon resonance characteristics. The energy band gap $E_g$ of 1.69 eV corresponds to the characteristic band gap of $Cu_2O$ and enables optical absorption in the visible wavelength range. The hydrophobic surface with a wetting contact angle of 85.2° maintains beneficial surface properties while showing the effects of increased oxidation compared to the 200° C. annealing condition.

Figure 6A:
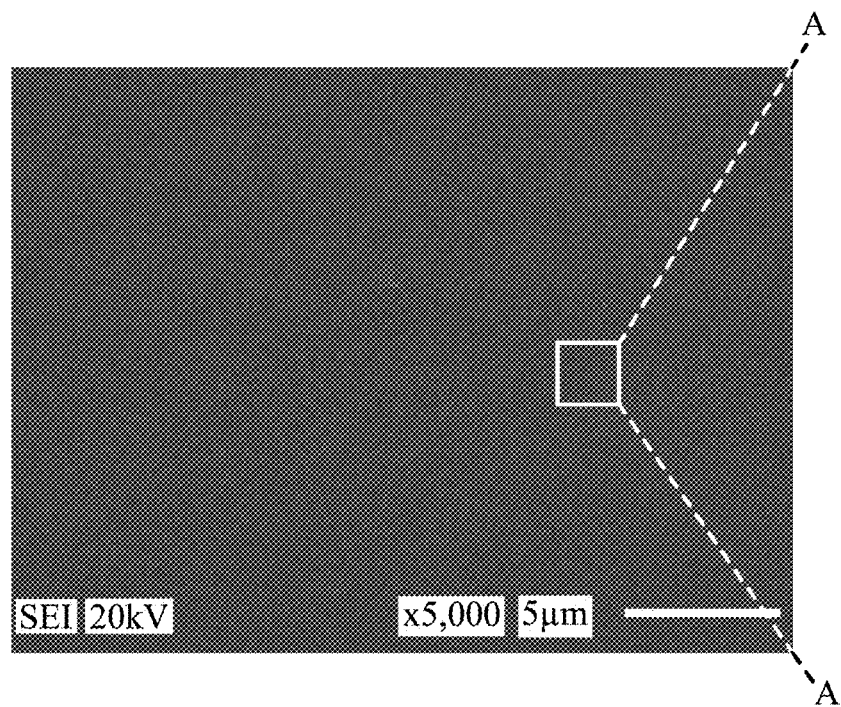
FIG. 6A is a scanning electron microscopy (SEM) micrograph of an as-developed copper thin film showing surface morphology, according to certain embodiments.
Figure 6B:
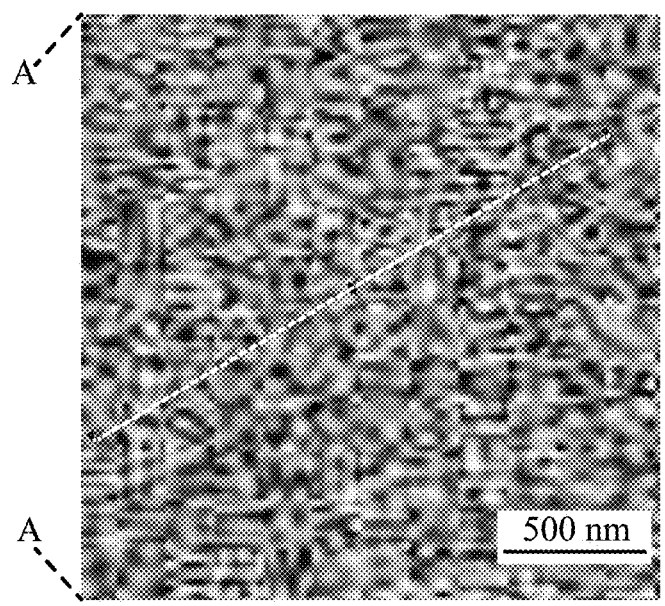
FIG. 6B is a scanning electron microscopy (SEM) micrograph showing a zoom-in view of the copper thin film surface with detailed topographical features, according to certain embodiments.
Figure 6C:
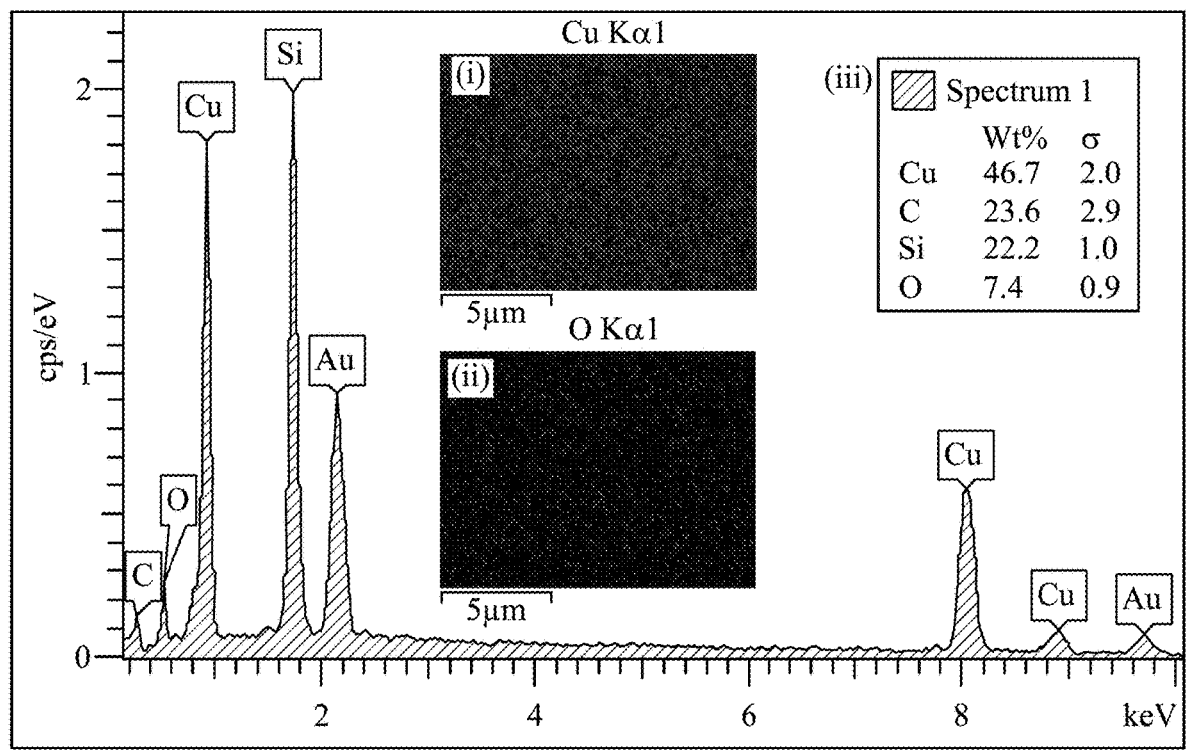
FIG. 6C is an energy dispersive spectroscopy (EDS) spectrum of the copper thin film showing elemental composition and distribution mapping, according to certain embodiments.
Figure 6D:
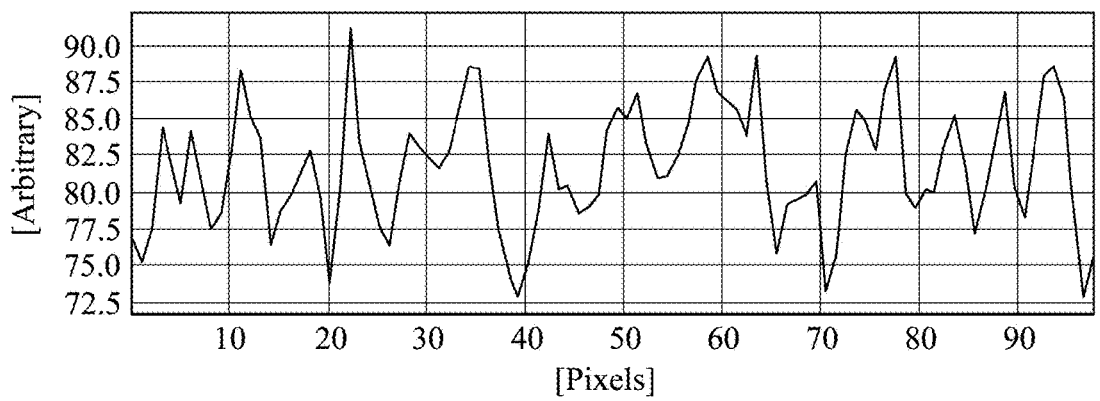
FIG. 6D is a line profile analysis along a selected area of the copper thin film showing surface height variations, according to certain embodiments.
Figure 6E:
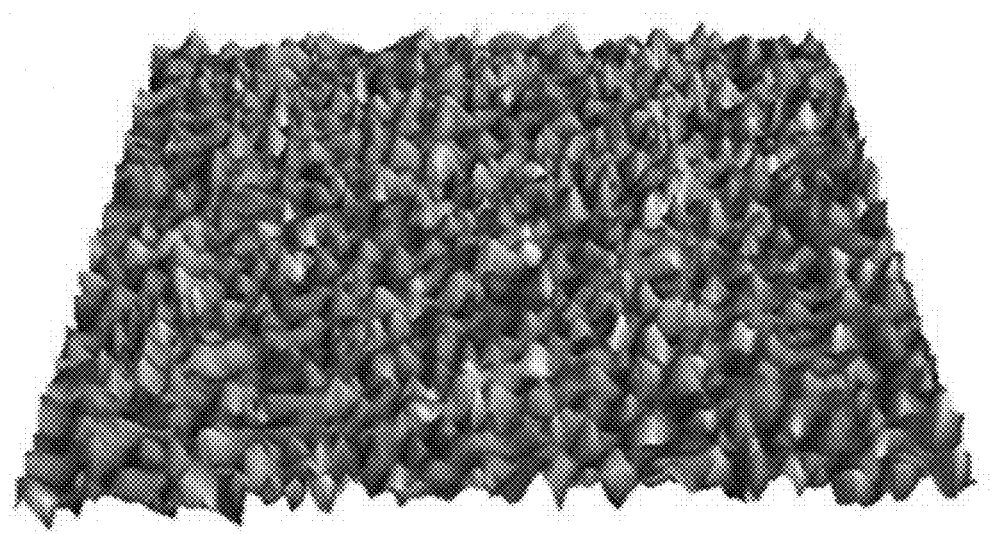
FIG. 6E is a 3D hawks-eye view of the copper thin film surface of FIG. 6B showing topographical characteristics, according to certain embodiments.

FIGS. 6A-6E present surface morphology and elemental composition analysis of the copper film 110 in its pristine as-deposited state on the quartz glass substrate 108. FIG. 6A presents a scanning electron microscopy micrograph of the as-developed copper film 110 showing that the surface was relatively smooth with uniform coverage across the quartz glass substrate 108. FIG. 6B presents a zoom-in view of the area marked by white square (2 µm×2 µm) revealing detailed topographical features of the copper film 110 surface. FIG. 6C presents energy dispersive spectroscopy spectrum of the copper film 110 confirming copper peaks at 0.93 keV ($CuL_\alpha$), 8.04 keV ($CuK_\alpha$), and 8.91 keV ($CuK_\beta$) along with silicon peak at 1.74 keV ($SiK_\alpha$) from the underlying quartz glass substrate 108, oxygen peak at 0.53 keV ($OK_\alpha$) from surface oxides, and gold peaks at 2.12 keV (AuM) and 9.71 keV ($AuK_\alpha$) from gold coating applied for imaging purposes. The elemental mapping analysis demonstrated homogeneous distribution of copper and oxygen elements across the copper film 110 surface with weight percentages showing the constituent elements were uniformly distributed without clusters or voids. FIG. 6D presents a line profile along the dashed line shown in FIG. 6B revealing that the surface was relatively smooth with minimal height variations. FIG. 6E presents a 3D hawks-eye view of the zoom-in area confirming the smooth top surface of the pristine copper film 110 with uniform topographical characteristics suitable for subsequent thermal processing and optical applications.

It may be noted that gold coating is commonly used in Scanning Electron Microscopy (SEM) for the sake of the enhancement of image quality and signal detection. Gold is chemically inert and therefore it does not react with the sample or environment during imaging. Non-conductive or poorly conductive samples can accumulate charges when exposed to the electron beam, which distorts the image.

Gold, being a highly conductive metal, provides a thin, uniform conductive layer that prevents charge buildup and ensures clear imaging. In addition, SEM relies on detecting secondary electrons emitted from the sample when it is bombarded by the electron beam. Gold is efficient at emitting secondary electrons, improving signal strength and contrast in SEM images.

Figure 7A:
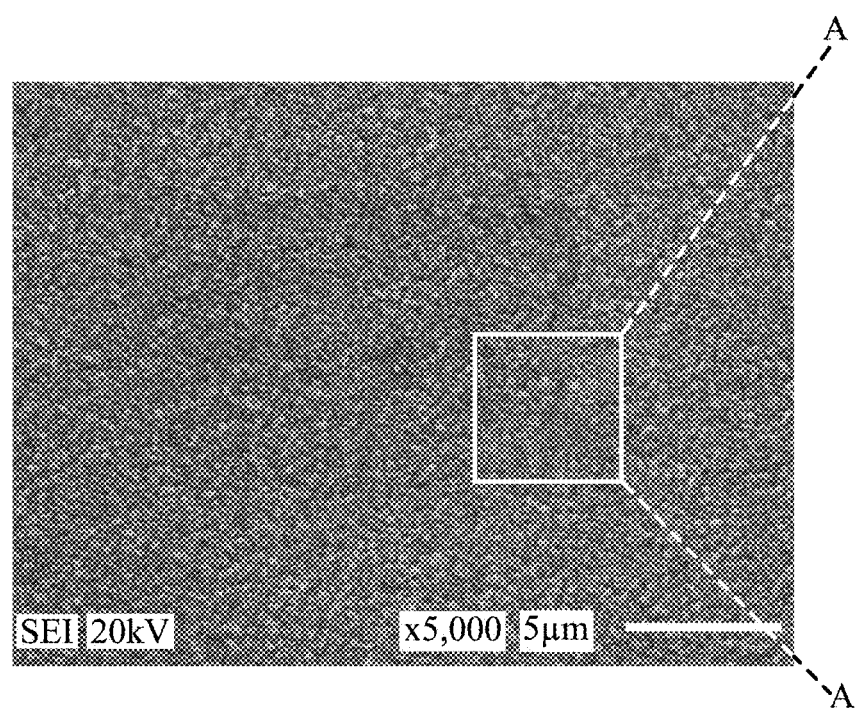
FIG. 7A is a scanning electron microscopy (SEM) micrograph of annealed copper thin film showing modified surface morphology with clusters and voids, according to certain embodiments.
Figure 7B:
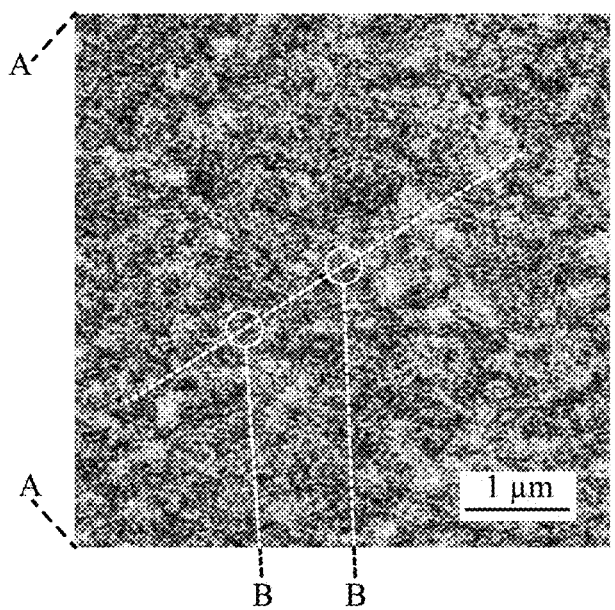
FIG. 7B is a scanning electron microscopy (SEM) micrograph showing a zoom-in view of the annealed copper thin film surface with detailed structural features, according to certain embodiments.
Figure 7C:
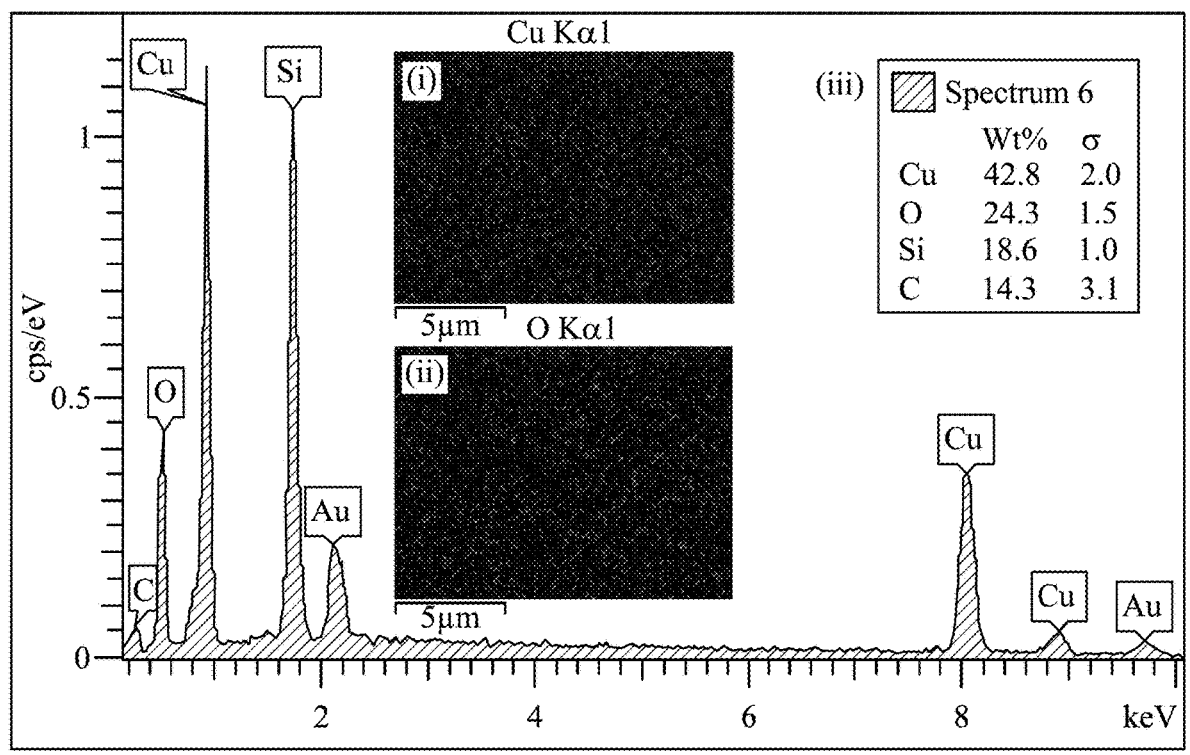
FIG. 7C is an energy dispersive spectroscopy (EDS) spectrum of the annealed copper thin film showing elemental composition changes after thermal treatment, according to certain embodiments.
Figure 7D:
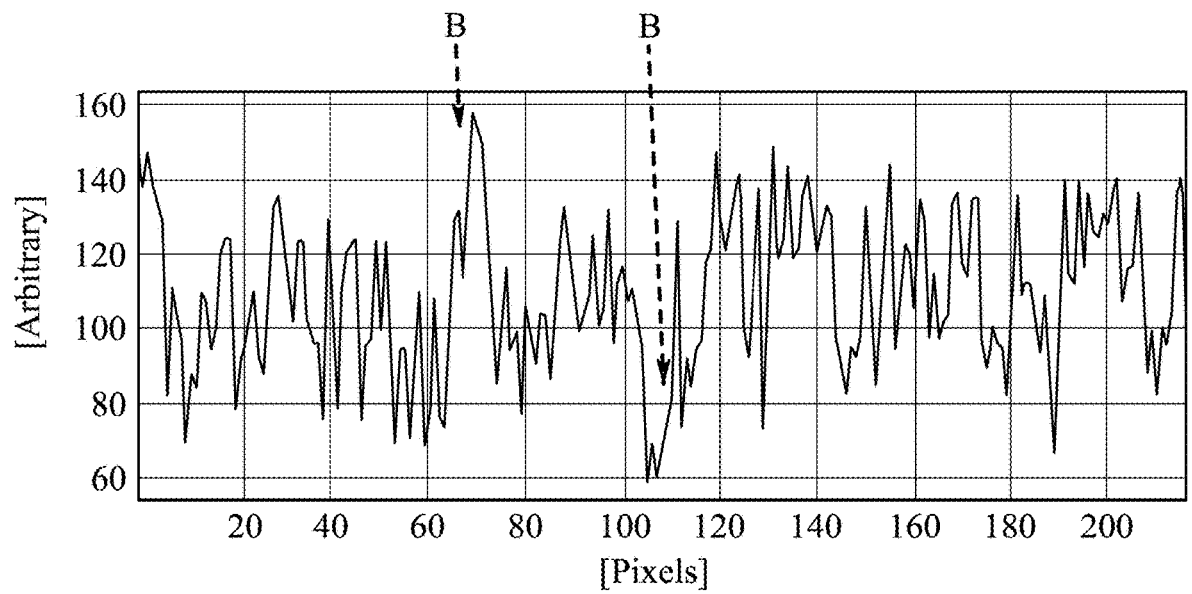
FIG. 7D is a line profile analysis of the annealed copper thin film showing height and depth variations of clusters and voids, according to certain embodiments.
Figure 7E:
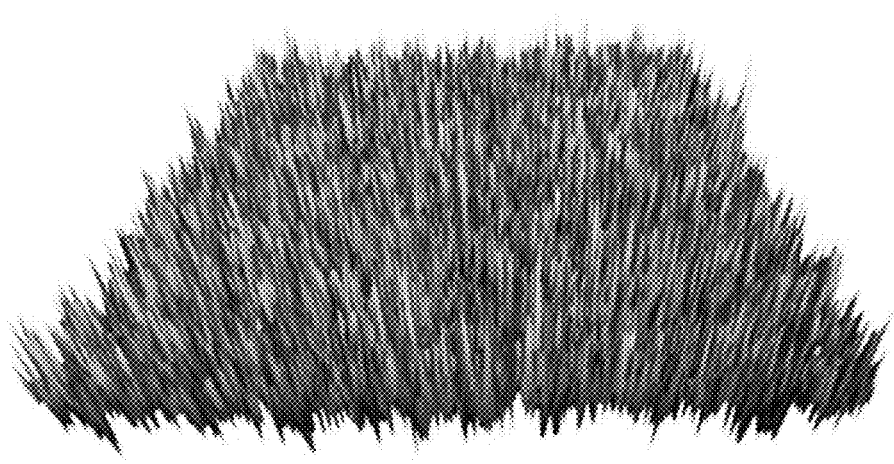
FIG. 7E is a three-dimensional hawks-eye view of the annealed copper thin film surface of FIG. 7B showing modified topographical characteristics, according to certain embodiments.

FIGS. 7A-7E illustrate the modified surface morphology and composition of the copper film 110 after annealing treatment at elevated temperatures, specifically at 600° C. for 2 hours. FIG. 7A presents a scanning electron microscopy micrograph of the annealed copper film demonstrating that the treated film surface was rougher and consisted of clusters and voids compared to the pristine copper film 110. FIG. 7B presents a zoom-in view of the area marked by white square (5 µm×5 µm) showing that the clusters and voids were of different sizes, with typical cluster and void structures marked by black circles. The formation of such clusters and voids was attributed to desorption of copper and oxygen at defect sites and defect site movement known as the Ostwald ripening effect within the copper film 110 during high temperature treatment. FIG. 7C presents an energy dispersive spectroscopy spectrum of the annealed copper film showing copper peaks at 0.93 keV ($CuL_\alpha$), 8.04 keV ($CuK_\alpha$), and 8.91 keV ($CuK_\beta$) along with substrate and coating peaks at corresponding energy levels, with elemental mapping revealing that constituent elements were less homogenously distributed with distinct clusters and voids recorded. The weight percentage analysis showed higher oxygen content (approximately 24.3%) compared to the pristine copper film 110. FIG. 7D presents a line profile along the dashed line shown in FIG. 7B indicating the height and depth of corresponding cluster and void structures respectively, with cluster and void positions marked by arrows corresponding to hill and dip positions in the line profile. FIG. 7E presents a 3D hawks-eye view of the zoom-in area confirming the roughened surface morphology with cluster and void formations that significantly modified the topographical characteristics of the annealed copper film compared to the pristine copper film 110.

Figure 8A:
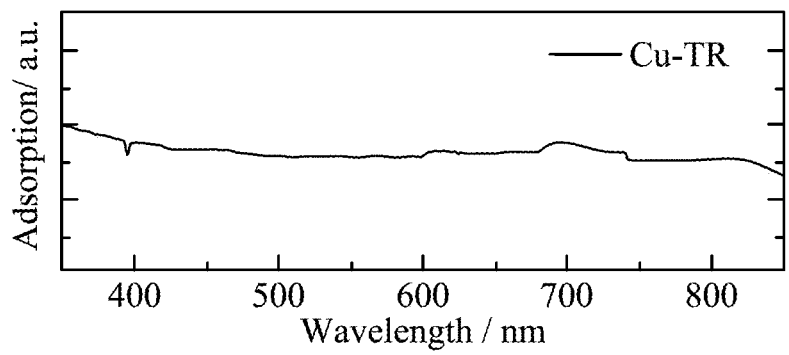
FIG. 8A is a UV-Vis absorption spectrum of a pristine copper thin film, according to certain embodiments.
Figure 8B:
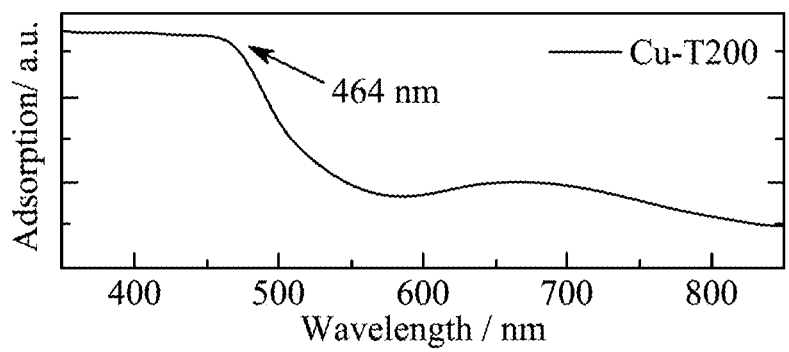
FIG. 8B is a UV-Vis absorption spectrum of a copper thin film annealed at 200° C., according to certain embodiments.
Figure 8C:
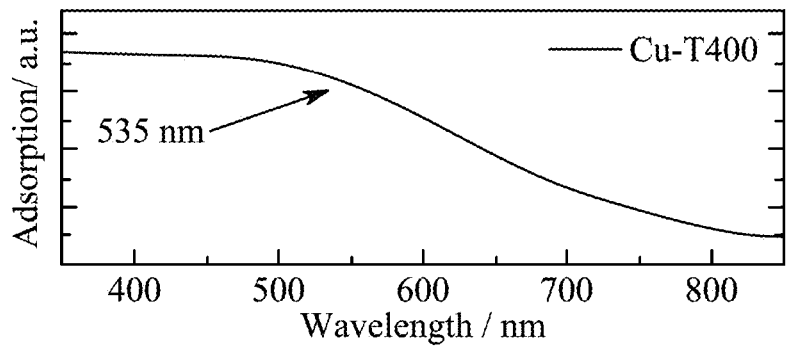
FIG. 8C is a UV-Vis absorption spectrum of a copper thin film annealed at 400° C., according to certain embodiments.
Figure 8D:
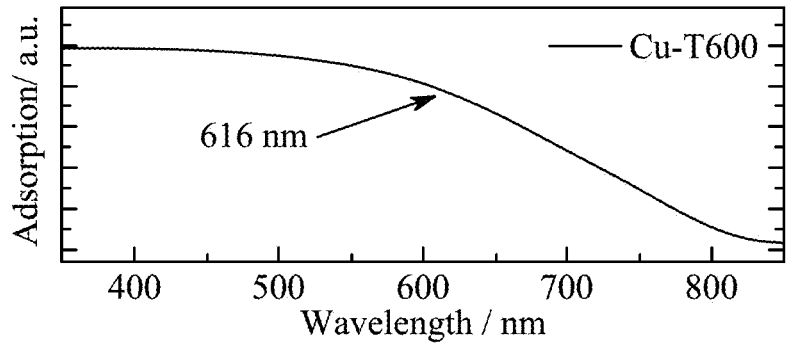
FIG. 8D is a UV-Vis absorption spectrum of a copper thin film annealed at 600° C., according to certain embodiments.

FIGS. 8A-8D present UV-Vis absorption spectra of the copper film 110 in pristine condition and after annealing at 200° C., 400° C., and 600° C. for 2 hours each. FIG. 8A presents the pristine copper film 110 exhibited characteristics typical of amorphous material without distinct absorption edges. FIG. 8B presents that annealing at 200° C. resulted in appearance of absorption edge at 464 nm (2.67 eV) indicating development of semiconductor characteristics. FIG. 8C presents the copper film 110 annealed at 400° C. showing the absorption edge at 535 nm (2.31 eV) demonstrating a red-shift compared to the 200° C. treatment. FIG. 8D presents the copper film 110 annealed at 600° C. exhibiting an absorption edge at 616 nm (2.01 eV) representing a further red-shift towards longer wavelengths with increasing annealing temperatures. The red-shift in absorption edges with increasing annealing temperatures was attributed to the effect of temperature on the atomic structure of the copper film 110, where higher temperatures caused rearrangements or phase changes leading to relaxation of atomic conformation. The UV-Vis absorption measurements revealed transformation from amorphous copper to various copper oxide phases depending on annealing temperature, with approximate absorption edges being highlighted for each thermal treatment condition.

Figure 9A:
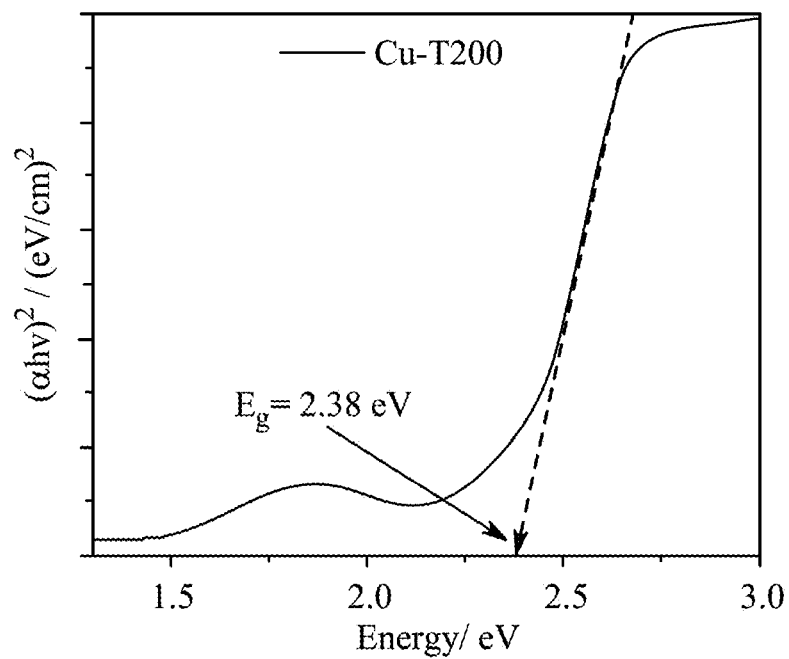
FIG. 9A is a Tauc plot of a copper thin film annealed at 200° C., according to certain embodiments.
Figure 9B:
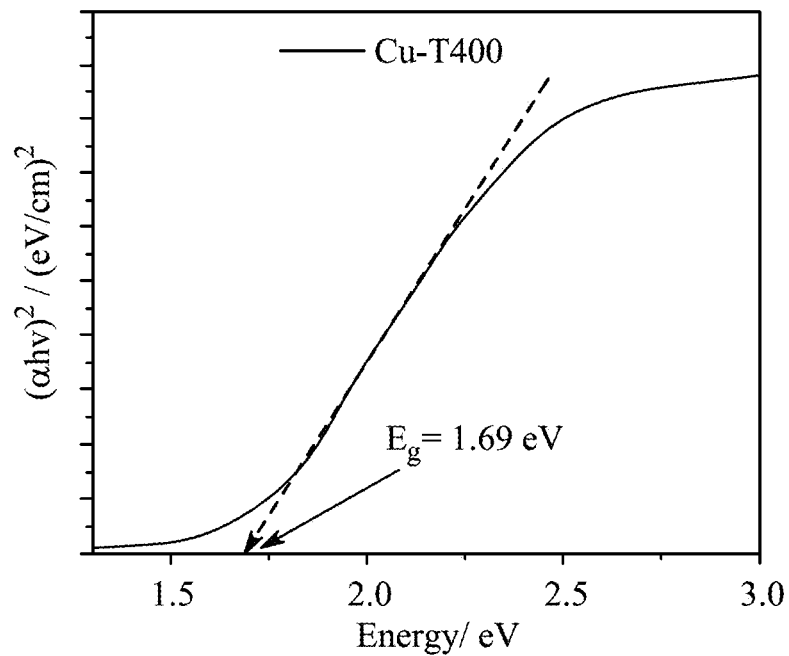
FIG. 9B is a Tauc plot of a copper thin film annealed at 400° C., according to certain embodiments.
Figure 9C:
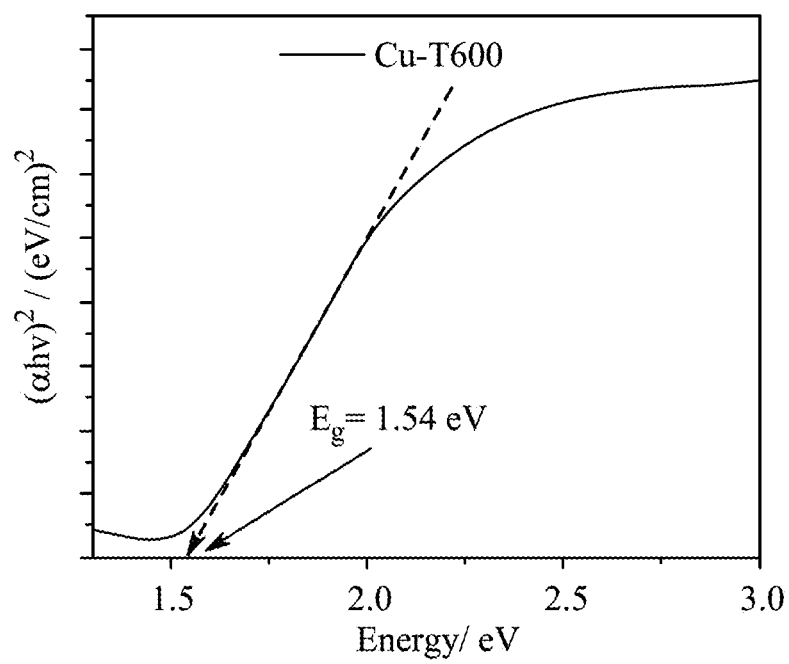
FIG. 9C is a Tauc plot of a copper thin film annealed at 600° C., according to certain embodiments.

FIGS. 9A-9C present Tauc plot analysis for determination of optical band gaps of the copper film 110 after annealing at different temperatures. The Tauc plots were constructed by plotting $(\alpha h\nu)^2$ versus hv, where α represents absorption coefficient and hv represents photon energy.

FIG. 9A presents the Tauc plot of the copper film 110 annealed at 200° C. yielding an optical band gap of 2.38 eV, indicating the copper film 110 remained in the early stage of nano-crystalline Cu-based oxide film formation, particularly $Cu_2O$ at the surface of amorphous film.

FIG. 9B presents the Tauc plot of copper film 110 annealed at 400° C. revealing an optical band gap of 1.69 eV, confirming transformation to nano-crystalline $Cu_2O$ thin film as the band gap value coincided with the reported optical band gap of $Cu_2O$ [See: Aromaa J, Kekkonen M, Mousapour M, Jokilaakso A, Lundström M (2021) The Oxidation of Copper in Air at Temperatures up to 100 C. Corrosion and Materials Degradation, incorporated herein by reference in its entirety].

FIG. 9C presents the Tauc plot of copper film 110 annealed at 600° C. showing an optical band gap of 1.54 eV, indicating complete oxidation of copper to CuO as the band gap value coincided with a reported optical band gap of CuO [See: Zhu Y, Mimura K, Isshiki M (2004) Oxidation mechanism of Cu 2 O to CuO at 600-1050 C. Oxidation of Metals, incorporated herein by reference in its entirety]. The systematic decrease in energy band gaps from 2.38 to 1.54 eV with increasing annealing temperatures confirmed the progressive transformation of the copper film 110 from Cu-based oxide to $Cu_2O$ and finally to CuO phases.

Figure 10A:
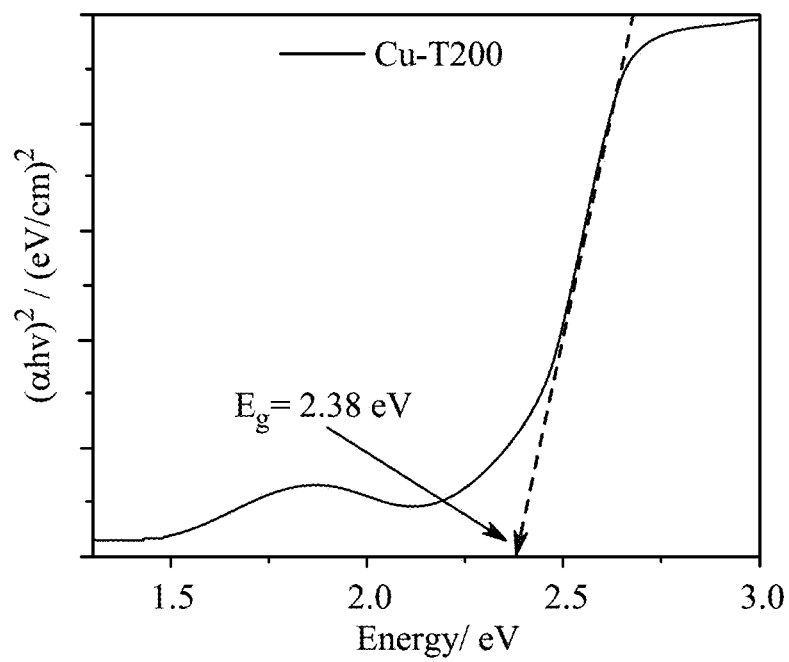
FIG. 10A is an Urbach plot of a copper thin film annealed at 200° C., according to certain embodiments.
Figure 10B:
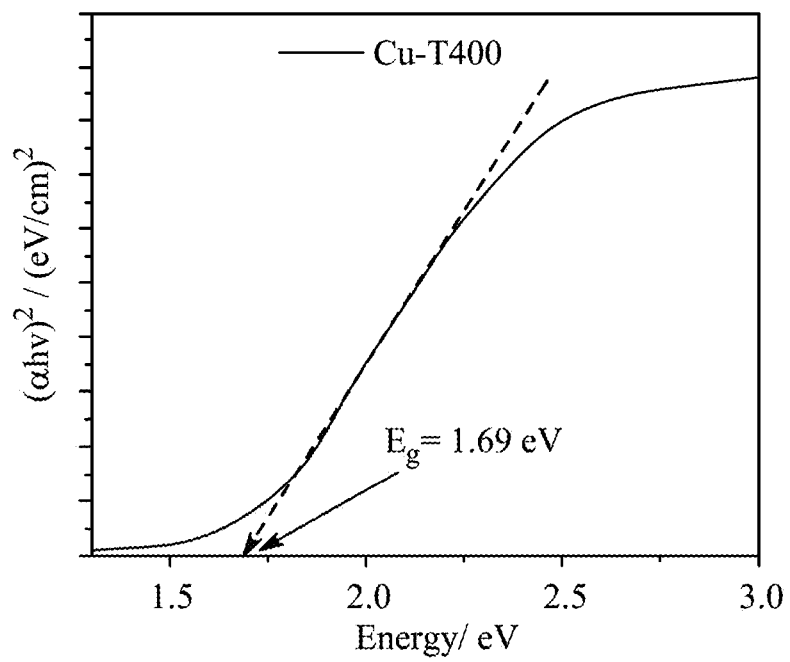
FIG. 10B is an Urbach plot of a copper thin film annealed at 400° C., according to certain embodiments.
Figure 10C:
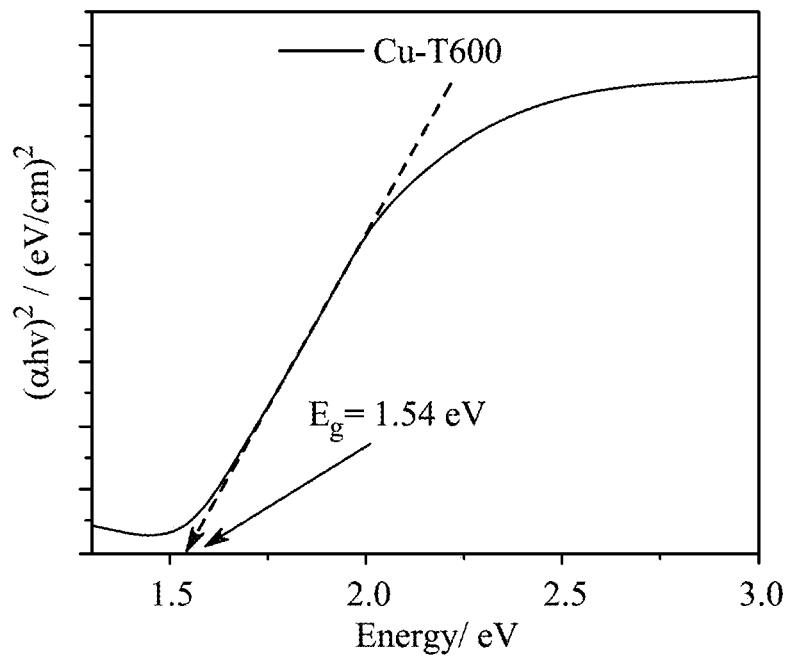
FIG. 10C is an Urbach plot of a copper thin film annealed at 600° C., according to certain embodiments.

FIGS. 10A-10C present an Urbach energy analysis of the copper film 110 annealed at different temperatures to characterize the degree of disorder within the thermally treated films. The Urbach plots were constructed by plotting the natural logarithm of absorption coefficient (lnα) as function of photon energy (hv), with Urbach energy determined by taking the inverse of the gradient at the linear region of the curve according to the equation (1) below $$\alpha = \alpha_0 e^{\frac{h\nu}{E_u}} \quad (1)$$

where $\alpha_0$ and $E_u$ are constants related to the low energy limit of the absorption coefficient and Urbach energy respectively.

FIG. 10A presents the copper film 110 annealed at 200° C. which exhibited Urbach energy of 193 meV. FIG. 10B presents the copper film 110 annealed at 400° C. which demonstrated Urbach energy of 272 meV. FIG. 10C presents the copper film 110 annealed at 600° C. showing Urbach energy of 205 meV. The reduction of Urbach energy from 272 meV to 205 meV after treatments at 400 and 600° C. was observed, although the film treated at 200° C. was found to have a lower Urbach energy (193 meV). The trend of decreasing Urbach energy coincided with reported values and was attributed to diminution of density of states, increase in crystallinity, decrease in degree of disorderness, and relaxation of distorted bonds [See: Rahman M M, Miran H A, Jiang Z T, Altarawneh M, Chuah L S, Lee H L, Hooi-L L, Amun A, Nicholas M, Dlugogorski B Z (2017) Investigation of the post-annealing electromagnetic response of Cu—Co oxide coatings via optical measurement and computational modelling. RSC advances, incorporated herein by reference in its entirety]. The Urbach energy analysis confirmed that the copper film 110 transformed into oxides after heat treatment where energy band gaps decreased with increasing annealing temperatures.

The refractive index is an important parameter in the design of SPR-based sensors. SPR sensors rely on the interaction between light and the surface plasmons, which are collective oscillations of electrons at the metal-dielectric interface. The refractive index of the surrounding medium affects the propagation of surface plasmons and can be used to detect changes in the surrounding. Refractive index and energy band gap are interrelated and Dimitrove and Sakka proposed the following formula (equation 2) to obtain the refractive index (n) of any thin film, $$\frac{n^2-1}{n^2+2} = 1 - \sqrt{\frac{E_g}{20}} \quad (2)$$

where, n and $E_g$ represent the refractive index and energy band gap of corresponding thin film. By simplifying the equation 2, one can find the refractive index, n as per equation 3 below.

$$n = \sqrt{\left(\frac{3+2\sqrt{\frac{E_g}{10}}}{\sqrt{\frac{E_g}{10}}}\right)} \quad (3)$$

Based on this relation, the refractive indexes of thin films of Cu annealed at 200, 400 and 600° C. were estimated to be 2.85, 3.05 and 3.11 respectively which are in good agreement with the reported values [See: Pelegrini, S., Tumelero, M. A., Brandt, I. S., Della Pace, R. D., Faccio, R., & Pasa, A. A. (2018). Electrodeposited $Cu_2O$ doped with Cl: Electrical and optical properties. Journal of Applied Physics, 123(16), 161567, incorporated herein by reference in its entirety].

Figure 11A:
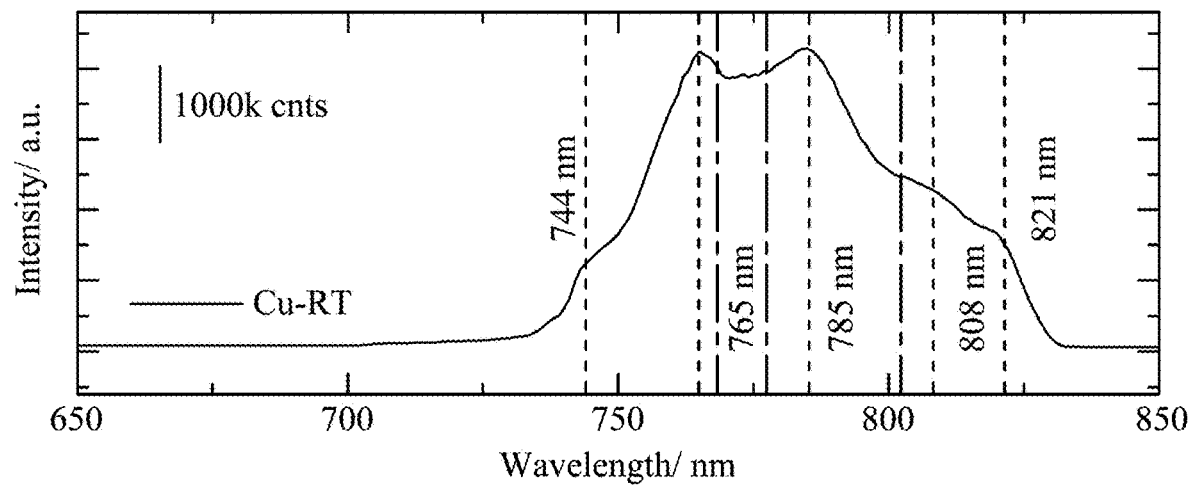
FIG. 11A is a photoluminescence emission spectrum of a pristine copper thin film, according to certain embodiments.
Figure 11B:
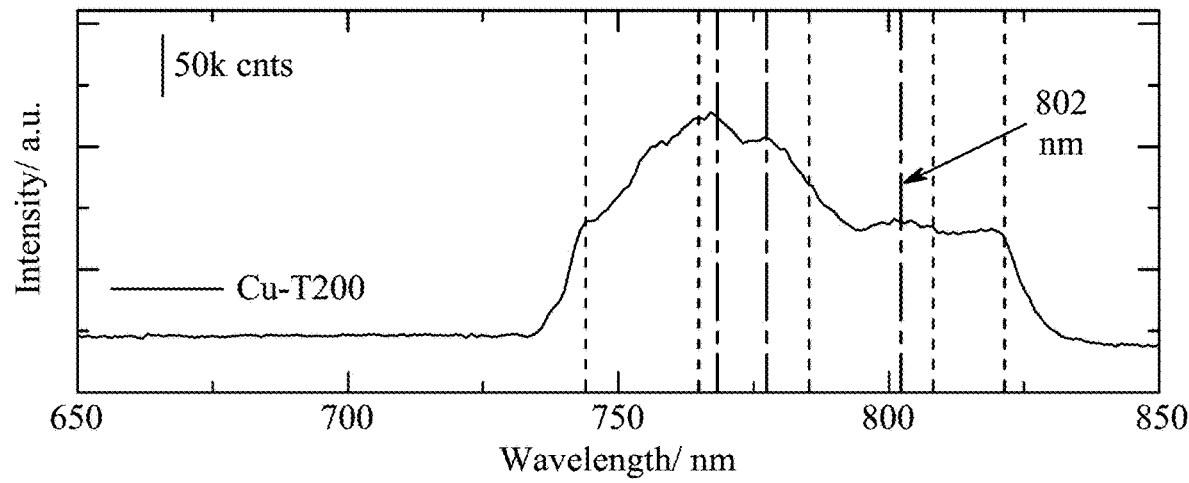
FIG. 11B is a photoluminescence emission spectrum of a copper thin film annealed at 200° C., according to certain embodiments.
Figure 11C:
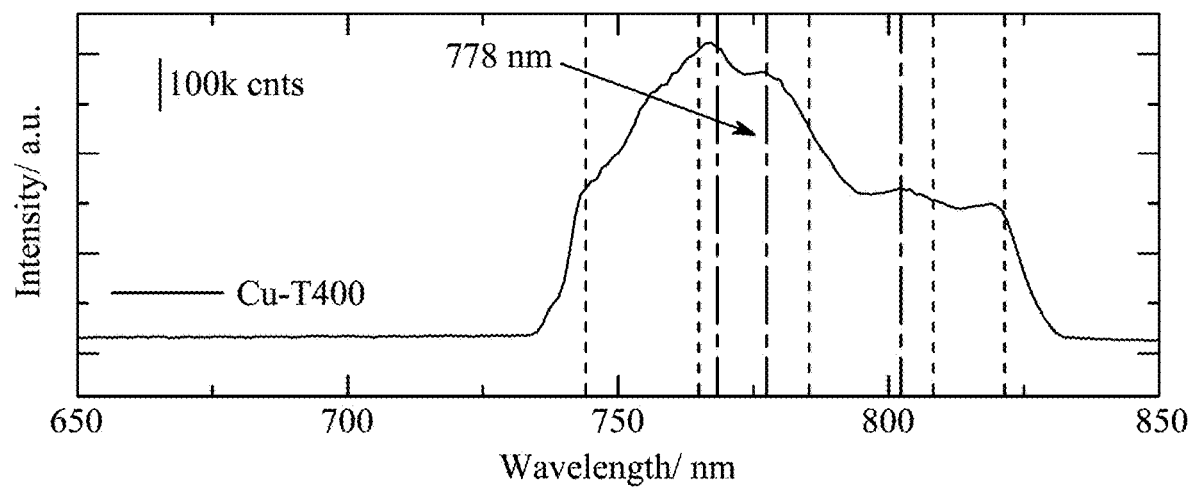
FIG. 11C is a photoluminescence emission spectrum of a copper thin film annealed at 400° C., according to certain embodiments.
Figure 11D:
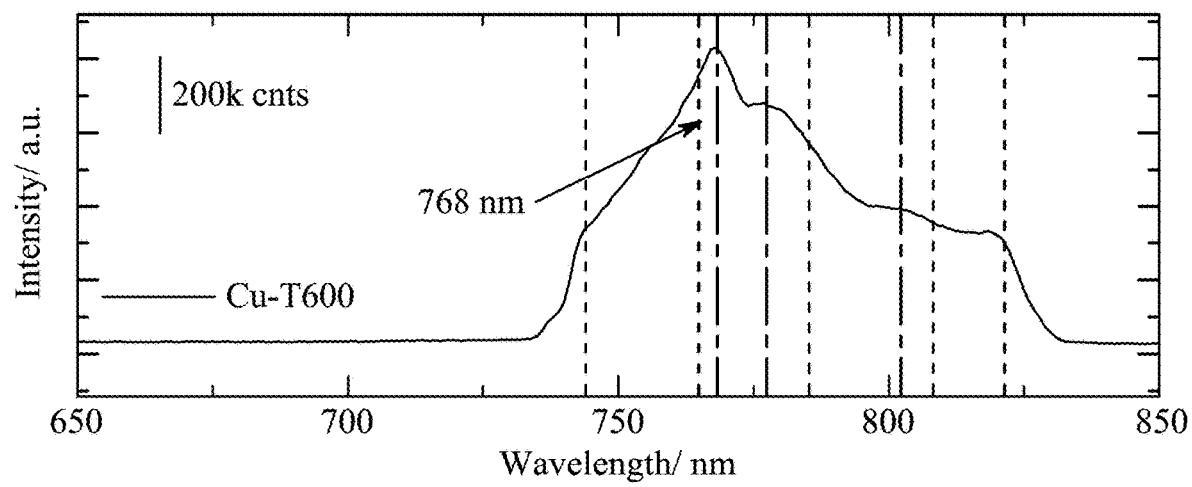
FIG. 11D is a photoluminescence emission spectrum of a copper thin film annealed at 600° C., according to certain embodiments.

FIGS. 11A-11D present the photoluminescence emission spectra of the copper film 110 in pristine condition and after annealing at 200° C., 400° C., and 600° C. for 2 hours each to analyze defect states within the thermally treated films. FIG. 11A presents the pristine copper film 110 exhibited two main photoluminescence bands at photon energies of 1.62 eV (765 nm) and 1.58 eV (785 nm) along with three shallow shoulder peaks at 1.67 eV (744 nm), 1.55 eV (808 nm), and 1.51 eV (821 nm). FIG. 11B presents the copper film 110 annealed at 200° C. showing that the photoluminescence band at 765 nm shifted to 768 nm and the band at 785 nm shifted to 778 nm. FIG. 11C presents the copper film 110 annealed at 400° C. demonstrating continued evolution of photoluminescence characteristics with further band modifications. FIG. 11D shows the copper film 110 annealed at 600° C. exhibiting additional photoluminescence modifications reflecting complete transformation to copper oxide phases. The photoluminescence bands at 744 nm (1.67 eV) and 820 nm (1.55 eV) were attributed to oxygen vacancies corresponding to doubly ionized vacancies and single ionized vacancies respectively [See: Ito T, Masumi T (1997) Detailed examination of relaxation processes of excitons in photoluminescence spectra of Cu 2 O. Journal of the Physical Society of Japan; Soltanmohammadi M, Spurio E, Gloystein A, Luches P, Nilius N (2023) Photoluminescence Spectroscopy of Cuprous Oxide: Bulk Crystal versus Crystalline Films. physica status solidi (a), incorporated herein by reference in their entirety]. The photoluminescence peaks at about 765 nm (1.62 eV) and 785 nm (1.58 eV) in the pristine copper film 110 were attributed to electronic levels $V_O^{+2}$ and $V_{Cu}$ respectively, while samples annealed at higher temperatures indicated shifted and higher photoluminescence emission at 768 nm (1.61 eV) due to higher oxygen vacancies and shifted and low photoluminescence emission at 778 nm (1.59 eV) corresponding to transformation of Cu to CuO at high temperature treatments.

Figure 12A:
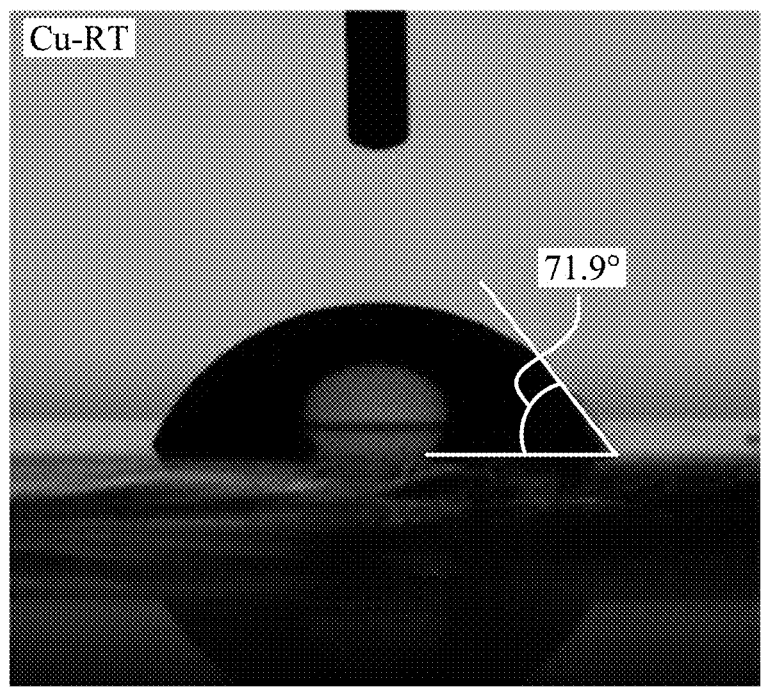
FIG. 12A is an image of a water droplet on a pristine copper thin film surface for a wetting contact angle measurement, according to certain embodiments.
Figure 12B:
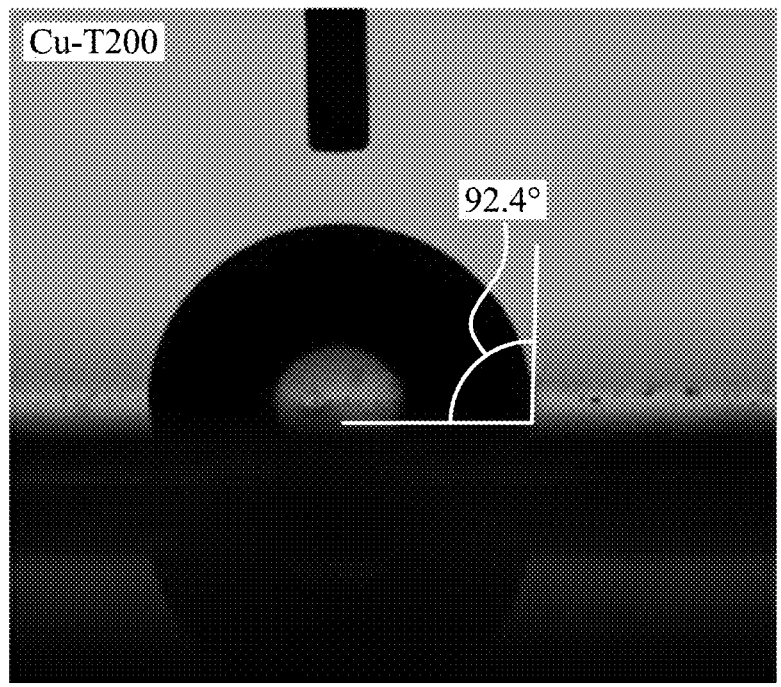
FIG. 12B is an image of a water droplet on a copper thin film annealed at 200° C. for a wetting contact angle measurement, according to certain embodiments.
Figure 12C:
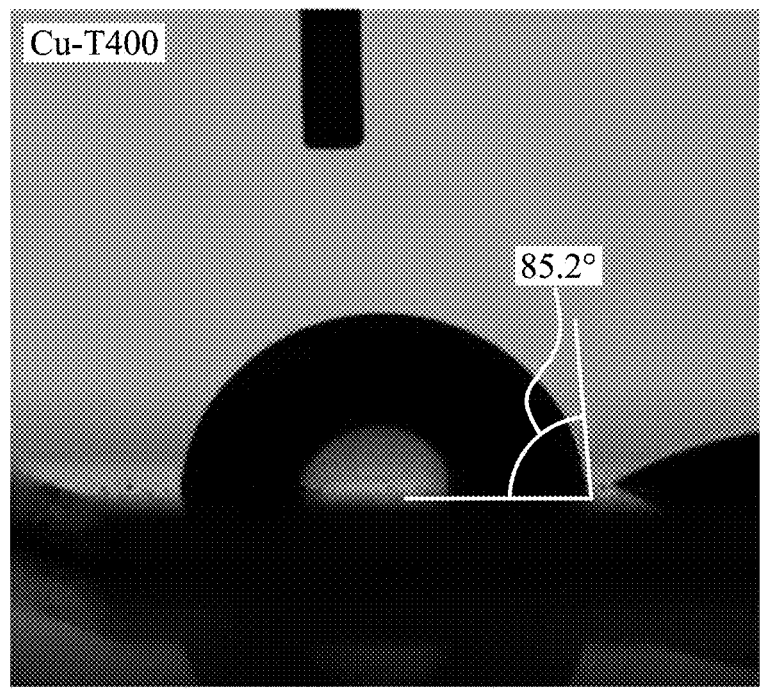
FIG. 12C is an image of a water droplet on a copper thin film annealed at 400° C. for a wetting contact angle measurement, according to certain embodiments.
Figure 12D:
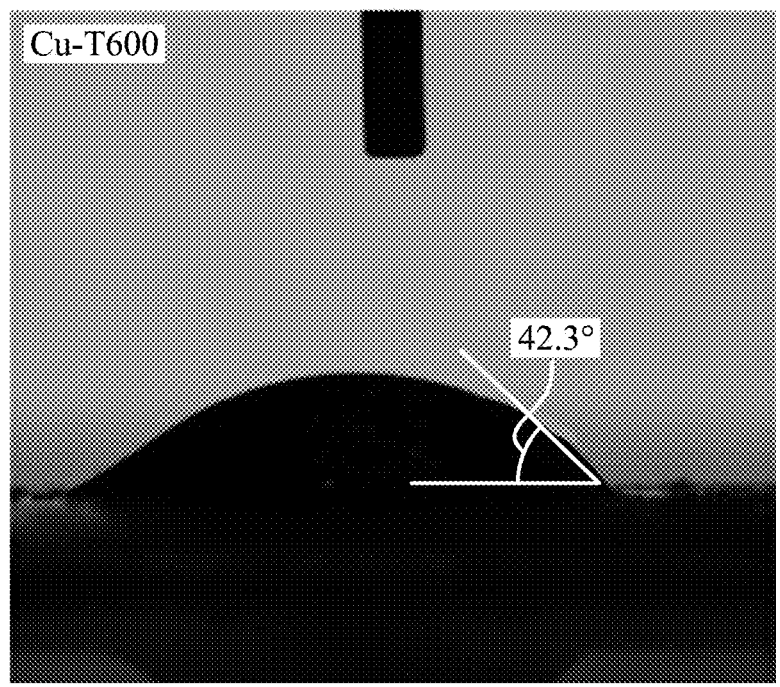
FIG. 12D is an image of a water droplet on a copper thin film annealed at 600° C. for a wetting contact angle measurement, according to certain embodiments.

FIGS. 12A-12D present wetting contact angle measurements for assessment of hydrophobic properties of the copper film 110 before and after annealing treatments at different temperatures. FIG. 12A presents a water droplet on a pristine copper film 110 surface revealing a moderate wetting contact angle of approximately 71.9°, indicating typical hydrophilic characteristics of metallic copper surfaces. FIG. 12B presents a water droplet on a copper film 110 annealed at 200° C. demonstrating increased wetting contact angle to approximately 92.4°, indicating enhanced hydrophobic characteristics compared to the pristine copper film 110. FIG. 12C presents a water droplet on a copper film 110 annealed at 400° C. exhibiting wetting contact angle of approximately 85.2°, maintaining hydrophobic characteristics while showing slight decrease compared to the 200° C. treatment. FIG. 12D presents a water droplet on a copper film 110 annealed at 600° C. showing significant reduction of wetting contact angle to approximately 42.3°, indicating transition to more hydrophilic surface characteristics. The surface became more hydrophobic when the copper film 110 was treated at 200 and 400° C. for 2 hours, however further annealing at 600° C. reduced the wetting contact angle and made the surface more hydrophilic [See: Mabrouki M (2019) Effect of annealing temperature on the structural, physical, chemical, and wetting properties of copper oxide thin films. Materials Today: Proceedings, incorporated herein by reference in its entirety]. The reduction of the contact angle at 600° C. was attributed to the effect of oxidation where surface morphology and chemical properties changed, and the formation of clusters and voids contributed to hydrophilic characteristics according to the Wenzel theory where surface roughness contributes to improvement of wettability [See: Li C, Zhang J, Han J, Yao B (2021) A numerical solution to the effects of surface roughness on water—coal contact angle. Scientific Reports, incorporated herein by reference in its entirety].

Figure 13A:
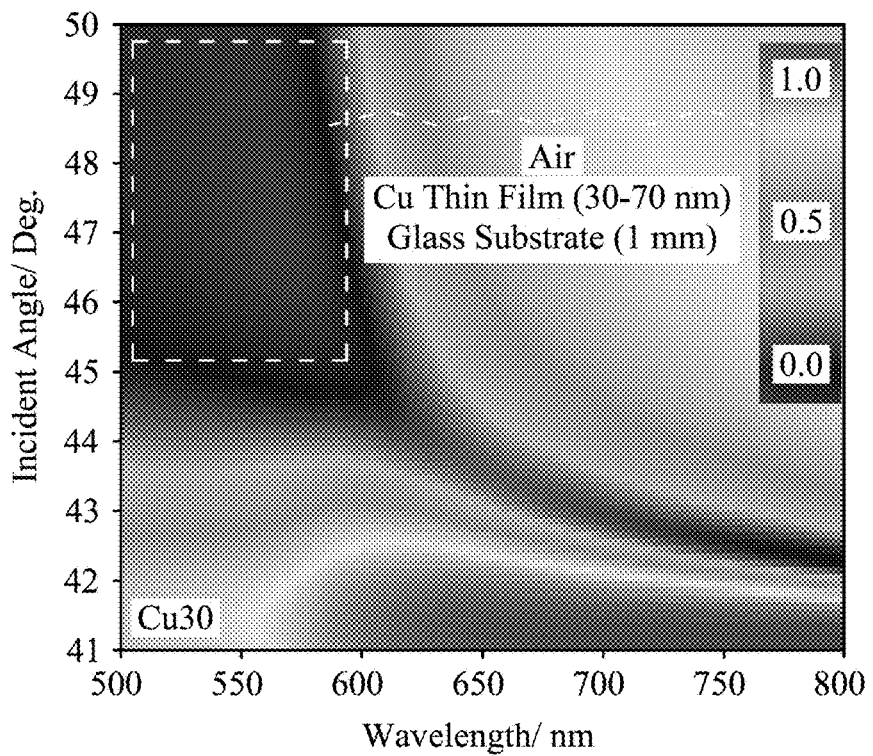
FIG. 13A is a spectral and angular-resolved reflectance mapping of a glass-copper-air interface with a 30 nm copper film thickness, according to certain embodiments.
Figure 13B:
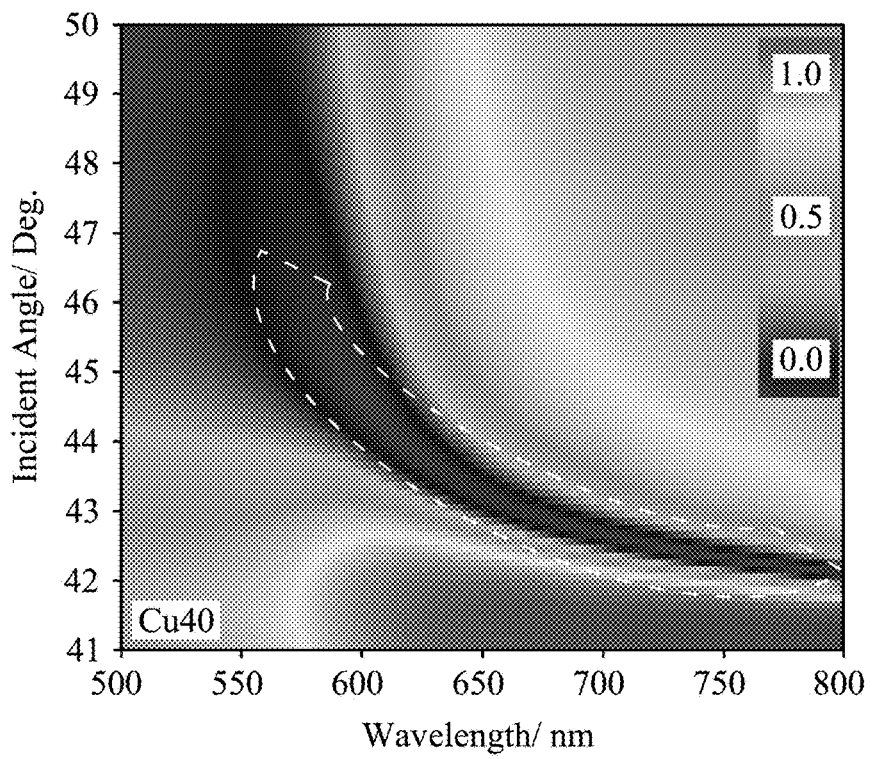
FIG. 13B is a spectral and angular-resolved reflectance mapping of a glass-copper-air interface with a 40 nm copper film thickness, according to certain embodiments.
Figure 13C:
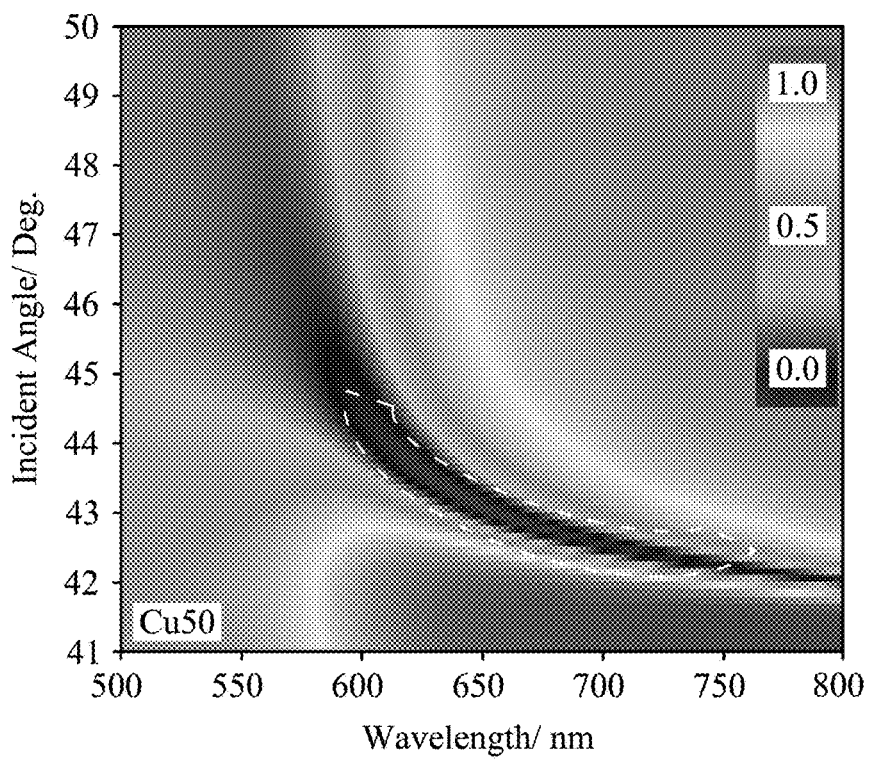
FIG. 13C is a spectral and angular-resolved reflectance mapping of a glass-copper-air interface with a 50 nm copper film thickness, according to certain embodiments.
Figure 13D:
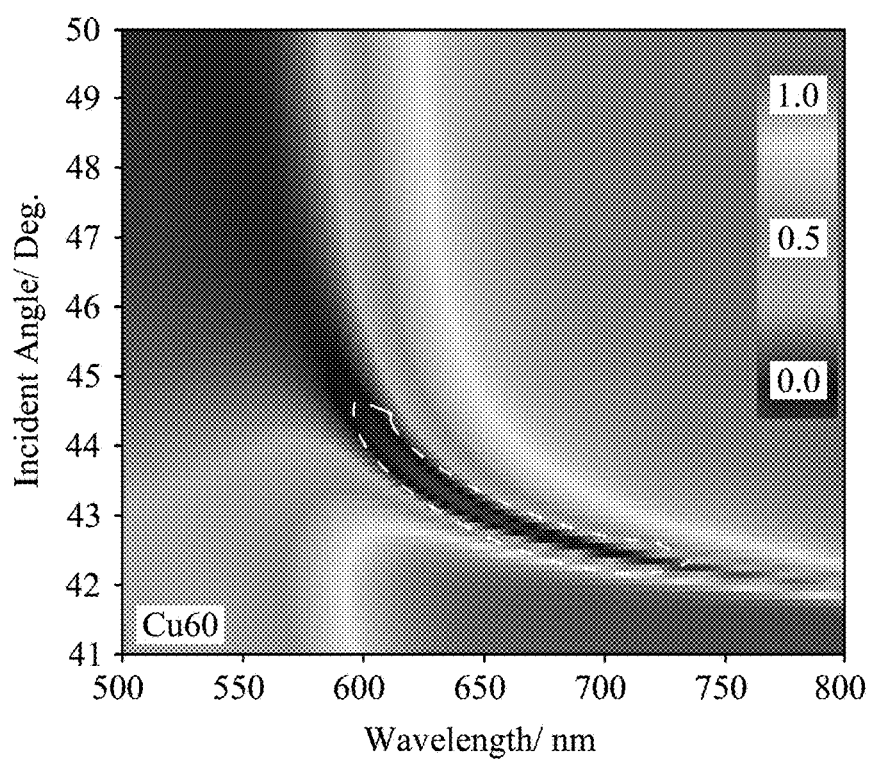
FIG. 13D is a spectral and angular-resolved reflectance mapping of a glass-copper-air interface with a 60 nm copper film thickness, according to certain embodiments.
Figure 13E:
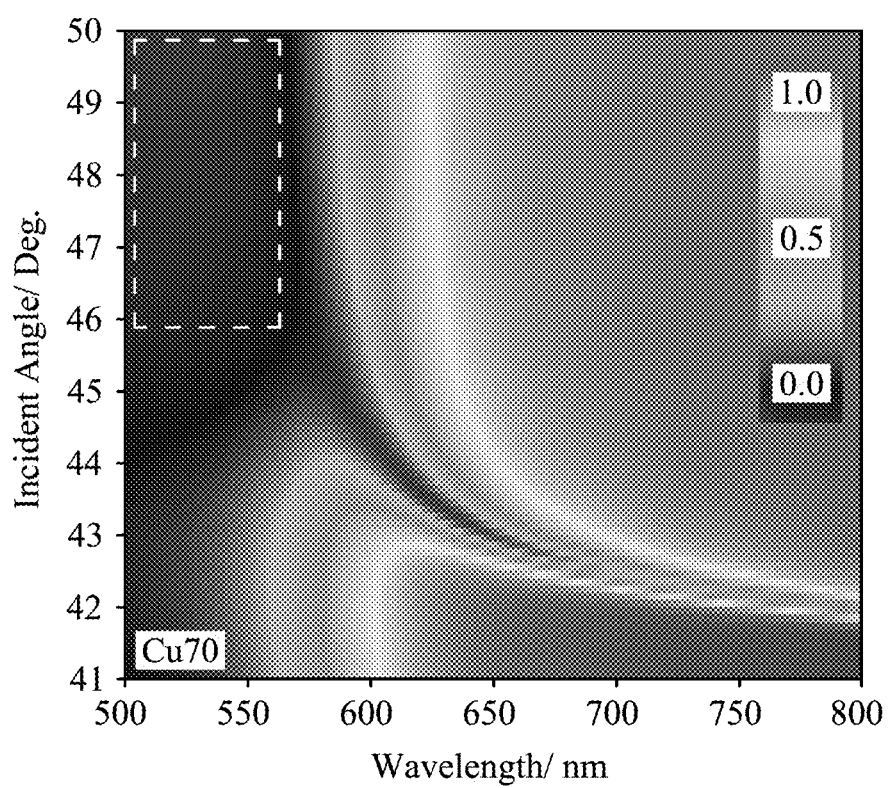
FIG. 13E is a spectral and angular-resolved reflectance mapping of a glass-copper-air interface with a 70 nm copper film thickness, according to certain embodiments.

FIGS. 13A-13E present spectral and angular-resolved p-polarized reflectance mappings of glass-copper-air interfaces over a broad spectral range from 500 to 800 nm wavelengths with copper film 110 thicknesses of 30, 40, 50, 60, and 70 nm respectively to optimize surface plasmon resonance characteristics. FIG. 13A presents a 30 nm copper film 110 exhibited reduced reflectance at particular incidence angles and spectral regions, with lowest intensity found at shorter wavelengths with larger spread. FIG. 13B presents the 40 nm copper film 110 demonstrated a lowest reflectance over the 600-800 nm spectral region with optimal surface plasmon coupling efficiency. FIG. 13C presents the 50 nm copper film 110 showing a minimum reflectance in the 600-800 nm region having reduced efficiency compared to 40 nm thickness. FIG. 13D presents the 60 nm copper film 110 exhibited further reduction in surface plasmon resonance efficiency with increased minimum reflectance values. FIG. 13E illustrates that the 70 nm copper film 110 demonstrated the poorest surface plasmon resonance characteristics with lowest intensity found at shorter wavelengths with a larger spread similar to the 30 nm thickness. The analysis revealed that reduced reflectance was observed at particular incidence angles and spectral regions for different thicknesses of copper film 110, with the 40 nm thickness providing optimal conversion of incident light energy into surface plasmons as reflectivity approached zero at this thickness, while any deviation from this reference value resulted in increased minimum reflectance indicating reduced rate of light utilization.

Figure 14A:
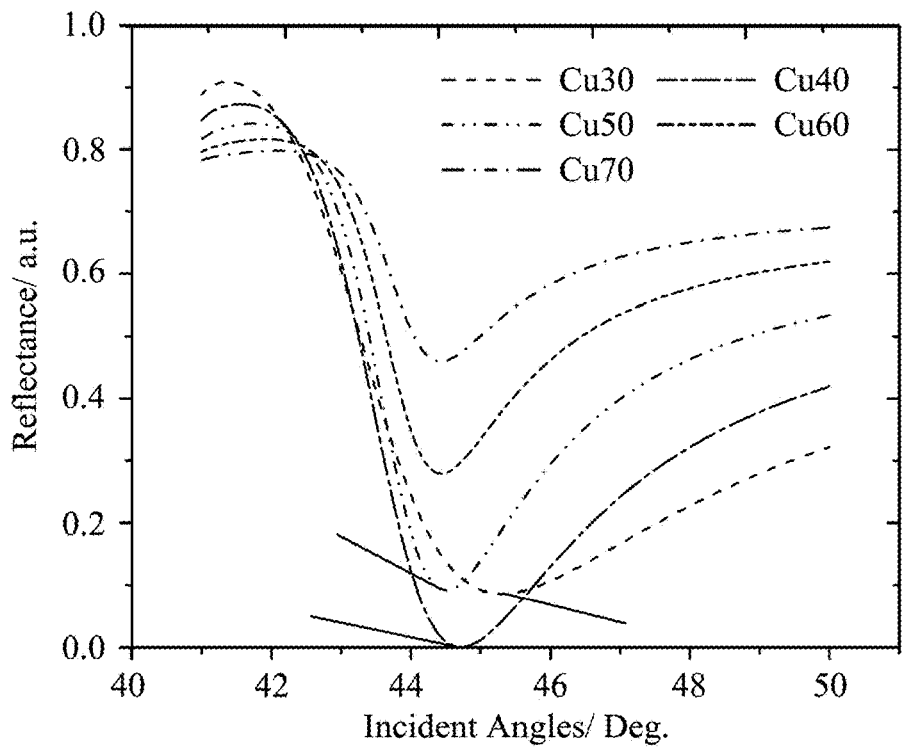
FIG. 14A is an angular-resolved reflectivity plot of a glass-copper-air interface at 600 nm wavelength for different copper film thicknesses, according to certain embodiments.
Figure 14B:
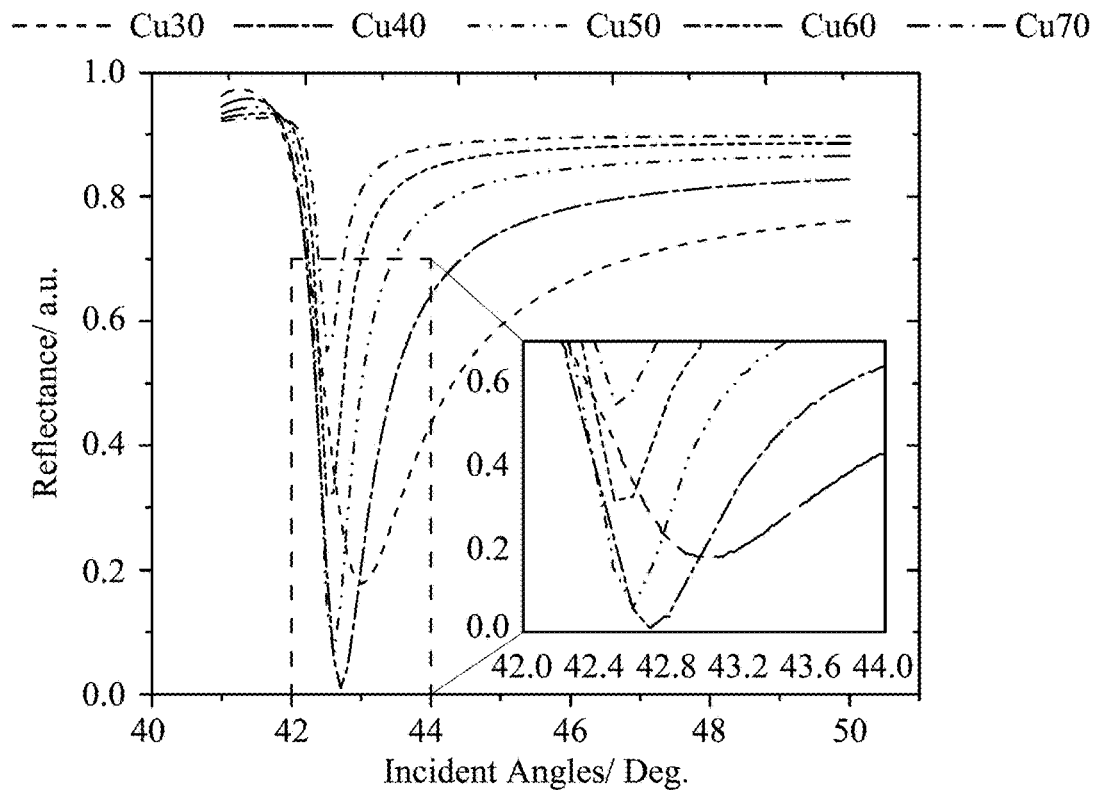
FIG. 14B is an angular-resolved reflectivity plot of a glass-copper-air interface at 700 nm wavelength for different copper film thicknesses, according to certain embodiments.
Figure 14C:
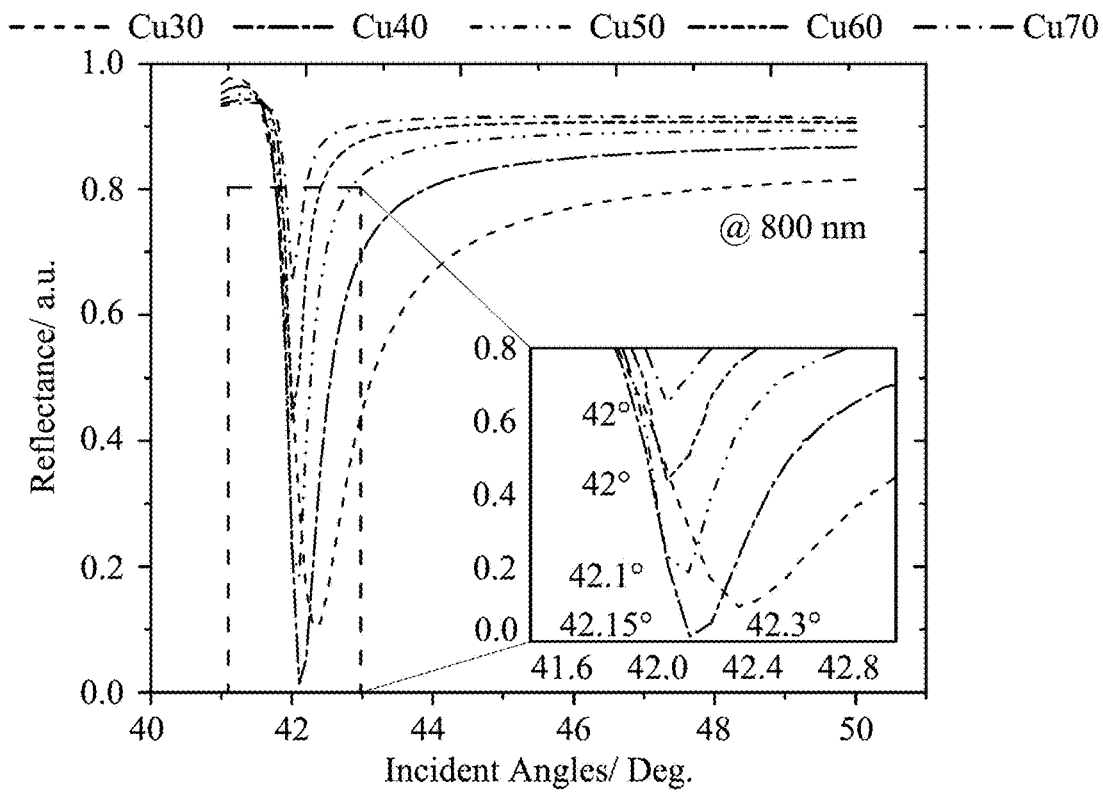
FIG. 14C is an angular-resolved reflectivity plot of a glass-copper-air interface at 800 nm wavelength for different copper film thicknesses, according to certain embodiments.

FIGS. 14A-14C present angular-resolved p-polarized reflectivity of glass-copper-air interfaces at 600, 700, and 800 nm wavelengths respectively with copper film 110 thicknesses of 30, 40, 50, 60, and 70 nm. FIG. 14A presents that, at a 600 nm wavelength, copper films 110 of 30, 40, 50, 60, and 70 nm thickness exhibited minimum reflectivity at incident angles of 45.3° (0.0861 a.u.), 44.7° (0.0002 a.u.), 44.5° (0.0910 a.u.), 44.45° (0.2784 a.u.), and 44.4° (0.4595 a.u.) respectively, with a 40 nm thickness demonstrating reflectivity approaching zero and maximum stimulation of surface plasmon resonance represented by deep and wide curve with full width at half maximum of 3.3°. FIG. 14B presents, that at a 700 nm wavelength, copper films 110 of 30, 40, 50, 60, and 70 nm thickness showed minimum reflectivity at incident angles of 43° (0.1779 a.u.), 42.7° (0.0097 a.u.), 42.6° (0.0629 a.u.), 42.55° (0.3189 a.u.), and 42.5° (0.5512 a.u.) respectively, with the 40 nm thickness providing maximum excitation of surface plasmon resonance resulting in deep and narrow curve with full width at half maximum of 0.816°. FIG. 14C presents, that at the 800 nm wavelength, copper films 110 of 30, 40, 50, 60, and 70 nm thickness exhibited minimum reflectivity at incident angles of 42.3° (0.1024 a.u.), 42.15° (0.0143 a.u.), 42.1° (0.1859 a.u.), 42° (0.4338 a.u.), and 42° (0.6519 a.u.) respectively, with the 40 nm thickness providing maximum excitation of surface plasmon resonance resulting in narrow and deep curve with full width at half maximum of 0.5°. The analysis confirmed that at a copper film 110 thickness of 40 nm, reflectivity approached zero permitting highest possible conversion of incident light energy into surface plasmons across all three wavelengths, while thicker copper films resulted in almost linear increase in minimum reflectance indicating decreased rate of light utilization.

Figure 15A:
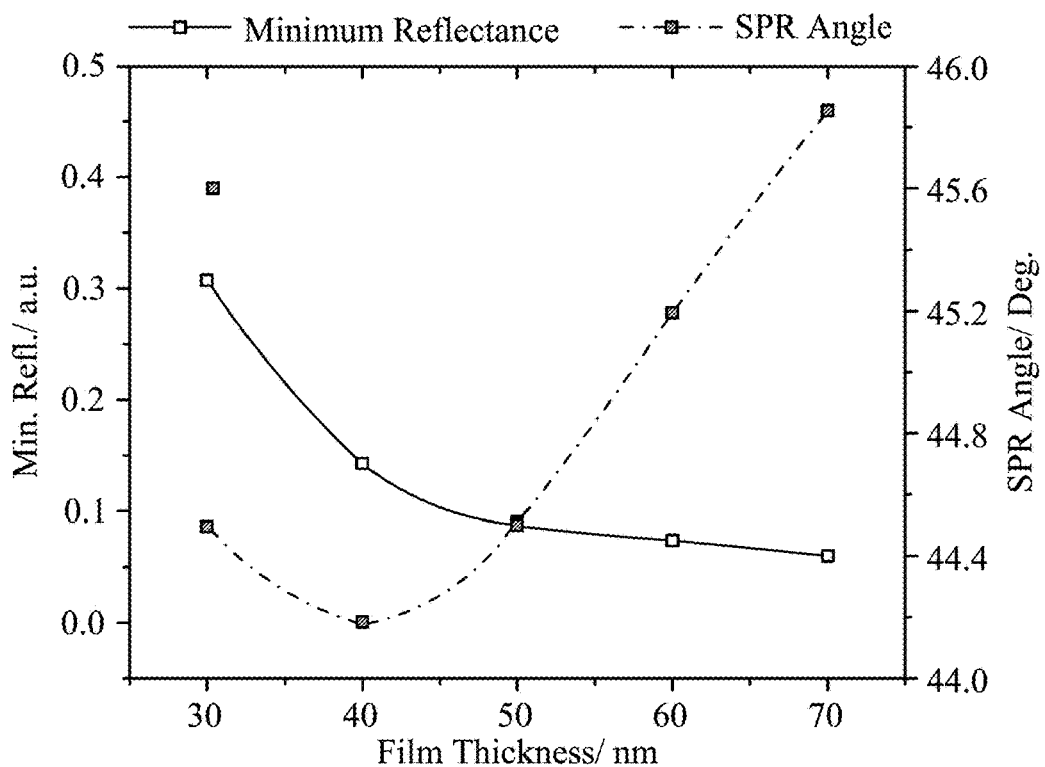
FIG. 15A is a plot of minimum reflectance and SPR angles for a glass-copper-air interface at 600 nm wavelength, according to certain embodiments.
Figure 15B:
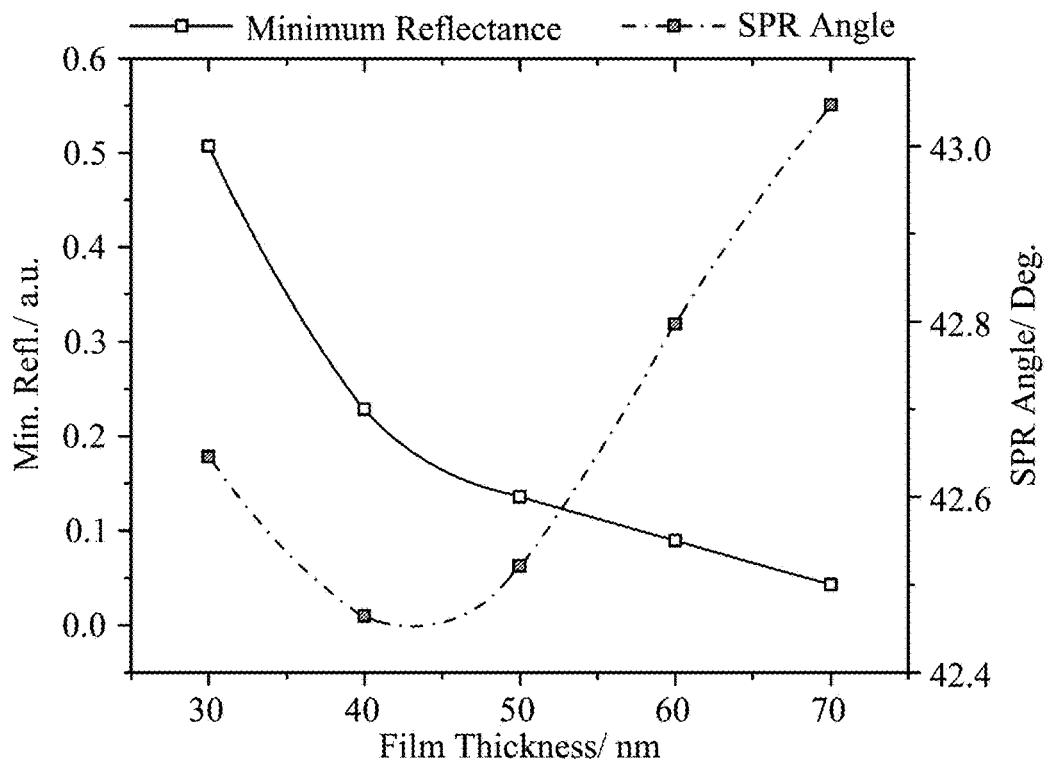
FIG. 15B is a plot of minimum reflectance and SPR angles for a glass-copper-air interface at a 700 nm wavelength, according to certain embodiments.
Figure 15C:
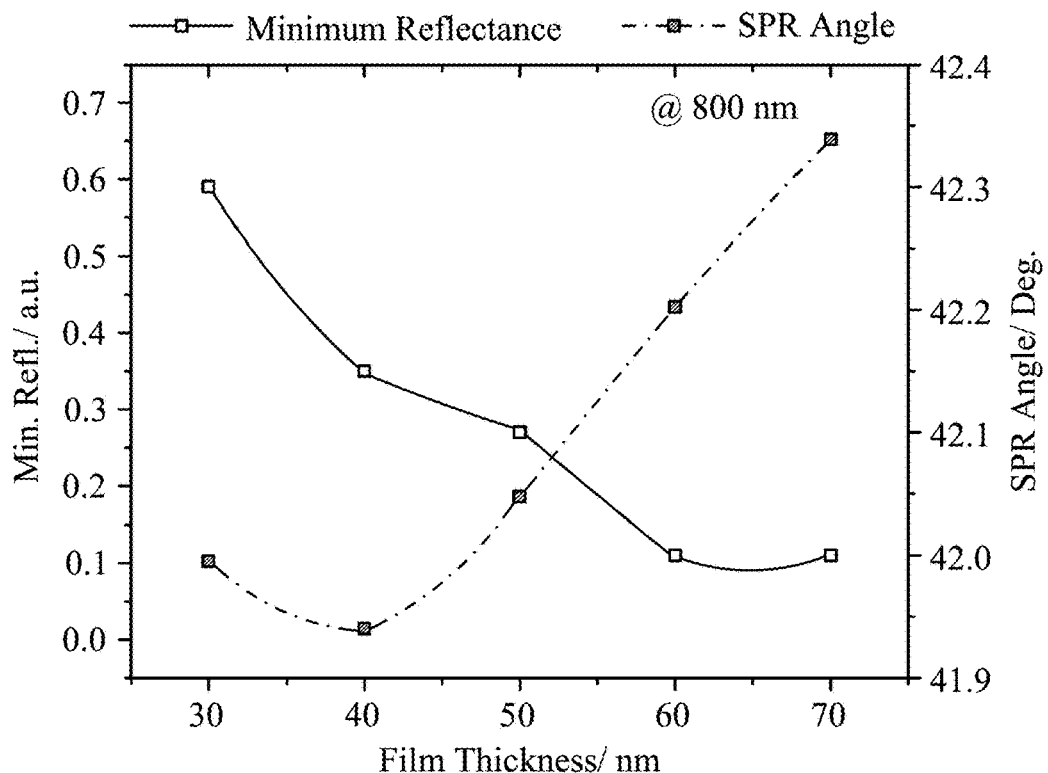
FIG. 15C is a plot of minimum reflectance and SPR angles for a glass-copper-air interface at a 800 nm wavelength, according to certain embodiments.

FIGS. 15A-15C present analysis of minimum reflectance and surface plasmon resonance angles of the glass-copper-air interface model at 600, 700, and 800 nm wavelengths respectively with copper film 110 thicknesses of 30, 40, 50, 60, and 70 nm. FIG. 15A presents, that at a 600 nm wavelength, the 40 nm copper film 110 provided minimum reflectance of 0.0002 arbitrary units at a surface plasmon resonance angle of 44.7° with maximum stimulation of surface plasmon resonance, while deviation from this thickness resulted in increased minimum reflectance with 30 nm thickness showing 0.0861 arbitrary units at 45.3° and thicker films of 50, 60, and 70 nm showing progressively increasing reflectance values of 0.0910, 0.2784, and 0.4595 arbitrary units respectively. FIG. 15B presents that at a 700 nm wavelength, the 40 nm copper film 110 exhibited a minimum reflectance of 0.0097 arbitrary units at a surface plasmon resonance angle of 42.7° providing maximum excitation of surface plasmon resonance, while other thicknesses showed higher reflectance values with 30 nm at 0.1779 arbitrary units and 50, 60, 70 nm films showing 0.0629, 0.3189, and 0.5512 arbitrary units respectively. FIG. 15C presents that at a 800 nm wavelength, the 40 nm copper film 110 demonstrated minimum reflectance of 0.0143 arbitrary units at surface plasmon resonance angle of 42.15° with maximum excitation of surface plasmon resonance, while other thicknesses exhibited progressively higher reflectance values. This analysis confirmed that optimized thickness of copper film 110 was 40 nm at surface plasmon resonance angles of 44.7°, 42.7°, and 42.15° at 600, 700, and 800 nm spectral wavelengths respectively, with surface plasmon resonance angles blue-shifting as thickness increased from 30 to 40 nm and then remaining relatively constant with small variations for thicker films.

The surface plasmon resonance sensor system 100 and the associated methods 400 and 500 of the present disclosure provide a cost-effective alternative to precious metal-based sensors while maintaining comparable detection performance. The utilization of copper-based materials reduces the system cost and enables broader implementation of surface plasmon resonance technology for various analytical applications. The controlled annealing processes enable tuning of the optical and surface properties to optimize sensor performance for specific target analyte detection requirements. The hydrophobic surface characteristics achieved through the annealing treatments provide advantages including reduced non-specific binding, improved chemical stability, and enhanced sensor lifetime. Further, the fabrication methods 400 and 500 of the present disclosure provide reproducible approaches for creating surface plasmon resonance sensors with consistent performance characteristics. The controlled sputtering and annealing processes enable precise control over film thickness, composition, and surface properties that determine sensor performance. The integration of optical components, microfluidics, and detection electronics creates a complete sensor system capable of quantitative target analyte detection through refractive index measurements. The sensor system 100 enables detection of various target analytes including proteins, nucleic acids, small molecules, and other chemical species depending on the specific binder selection and surface functionalization approaches.

The multiple annealing temperature options (200° C., 400° C., and 600° C.) provide flexibility in optimizing sensor performance for different applications and target analyte requirements. The resulting copper oxide phases (Cu, $Cu_2O$, and CuO) provide different optical properties, surface characteristics, and chemical stability that can be matched to specific detection requirements. The hydrophobic properties achieved through controlled annealing provide particular advantages for applications involving aqueous samples where reduced water adsorption and improved chemical stability are beneficial. Such versatility of the surface plasmon resonance sensor system 100 as used in applications in various fields including biomedical diagnostics, environmental monitoring, food safety testing, and chemical analysis provides real-time detection capabilities and label-free measurement and provide advantages over conventional detection methods that require sample labeling or complex sample preparation procedures. The surface plasmon resonance sensor system 100 provides potential for miniaturization and integration into portable or point-of-care devices for field applications where rapid, accurate detection is required.

While specific embodiments of the invention have been described, it should be understood that various modifications and alternatives may be implemented without departing from the spirit and scope of the invention. The specific annealing temperatures, thicknesses, and wavelength ranges provided represent optimized conditions, but other parameter values within reasonable ranges may also provide effective sensor performance. The fabrication methods may be adapted for different substrate materials, film deposition techniques, and surface functionalization approaches while maintaining the fundamental principles of surface plasmon resonance detection using copper-based thin films.

Figure 16:
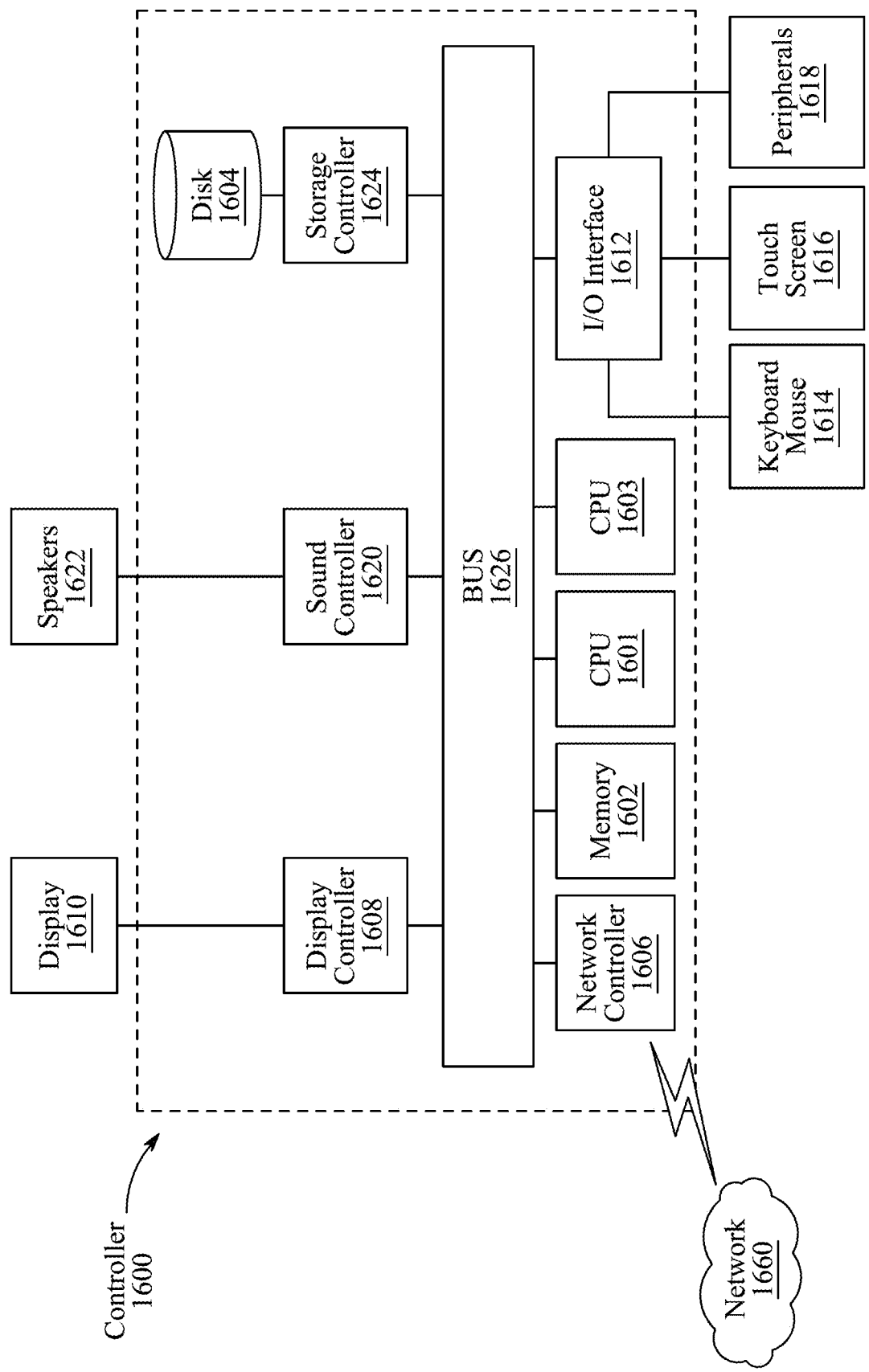
FIG. 16 is an illustration of a non-limiting example of details of computing hardware used in the computing system, according to certain embodiments.

Next, further details of the hardware description of the computing environment according to exemplary embodiments is described with reference to FIG. 16. In FIG. 16, a controller 1600 is described embodying the computing unit 150 of the surface plasmon resonance sensor system 100 of the present disclosure, in which the controller is a computing device which includes a CPU 1601 which performs the processes described above/below. The process data and instructions may be stored in memory 1602. These processes and instructions may also be stored on a storage medium disk 1604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1601, 1603 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1601 or CPU 1603 may be a Xenon or Core processor from Intel of America or an Opteron processor from AMD of America, or may be other processor types that would be recognized by one of ordinary skill in the art. Alternatively, the CPU 1601, 1603 may be implemented on an FPGA, ASIC, PLD or using discrete logic circuits, as one of ordinary skill in the art would recognize. Further, CPU 1601, 1603 may be implemented as multiple processors cooperatively working in parallel to perform the instructions of the inventive processes described above.

The computing device in FIG. 16 also includes a network controller 1606, such as an Intel Ethernet PRO network interface card from Intel Corporation of America, for interfacing with network 1660. As can be appreciated, the network 1660 can be a public network, such as the Internet, or a private network such as an LAN or WAN network, or any combination thereof and can also include PSTN or ISDN sub-networks. The network 1660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 1608, such as a NVIDIA GeForce GTX or Quadro graphics adaptor from NVIDIA Corporation of America for interfacing with display 1610, such as a Hewlett Packard HPL2445w LCD monitor. A general purpose I/O interface 1612 interfaces with a keyboard and/or mouse 1614 as well as a touch screen panel 1616 on or separate from display 1610. General purpose I/O interface also connects to a variety of peripherals 1618 including printers and scanners, such as an OfficeJet or DeskJet from Hewlett Packard.

A sound controller 1620 is also provided in the computing device such as Sound Blaster X-Fi Titanium from Creative, to interface with speakers/microphone 1622 thereby providing sounds and/or music.

The general purpose storage controller 1624 connects the storage medium disk 1604 with communication bus 1626, which may be an ISA, EISA, VESA, PCI, or similar, for interconnecting all of the components of the computing device. A description of the general features and functionality of the display 1610, keyboard and/or mouse 1614, as well as the display controller 1608, storage controller 1624, network controller 1606, sound controller 1620, and general purpose I/O interface 1612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 17.

Figure 17:
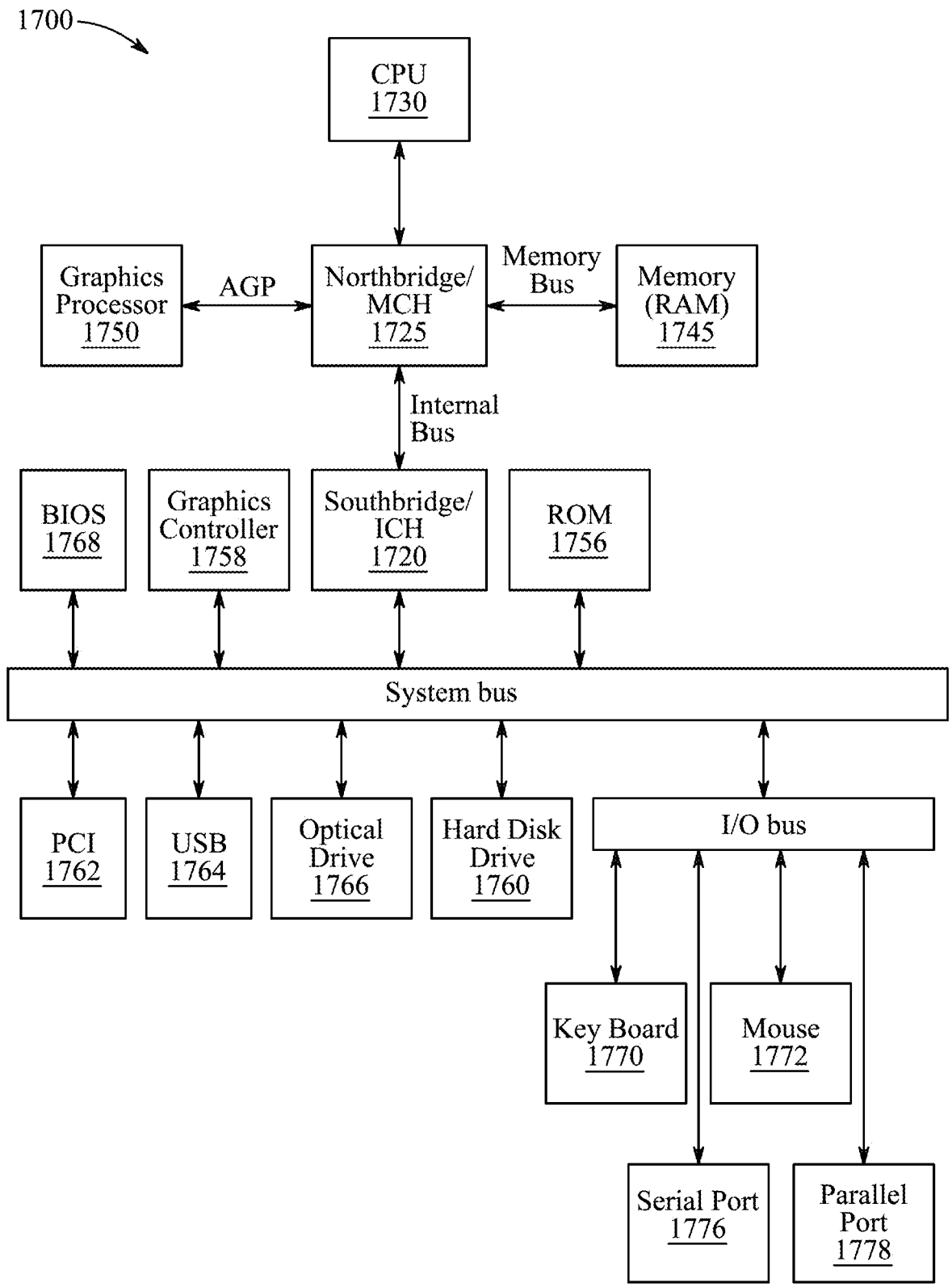
FIG. 17 is an exemplary schematic diagram of a data processing system used within the computing system, according to certain embodiments.

FIG. 17 shows a schematic diagram of a data processing system, according to certain embodiments, for performing the functions of the exemplary embodiments. The data processing system is an example of a computer in which code or instructions implementing the processes of the illustrative embodiments may be located.

In FIG. 17, data processing system 1700 employs a hub architecture including a north bridge and memory controller hub (NB/MCH) 1725 and a south bridge and input/output (I/O) controller hub (SB/ICH) 1720. The central processing unit (CPU) 1730 is connected to NB/MCH 1725. The NB/MCH 1725 also connects to the memory 1745 via a memory bus, and connects to the graphics processor 1750 via an accelerated graphics port (AGP). The NB/MCH 1725 also connects to the SB/ICH 1720 via an internal bus (e.g., a unified media interface or a direct media interface). The CPU Processing unit 1730 may contain one or more processors and even may be implemented using one or more heterogeneous processor systems.

Figure 18:
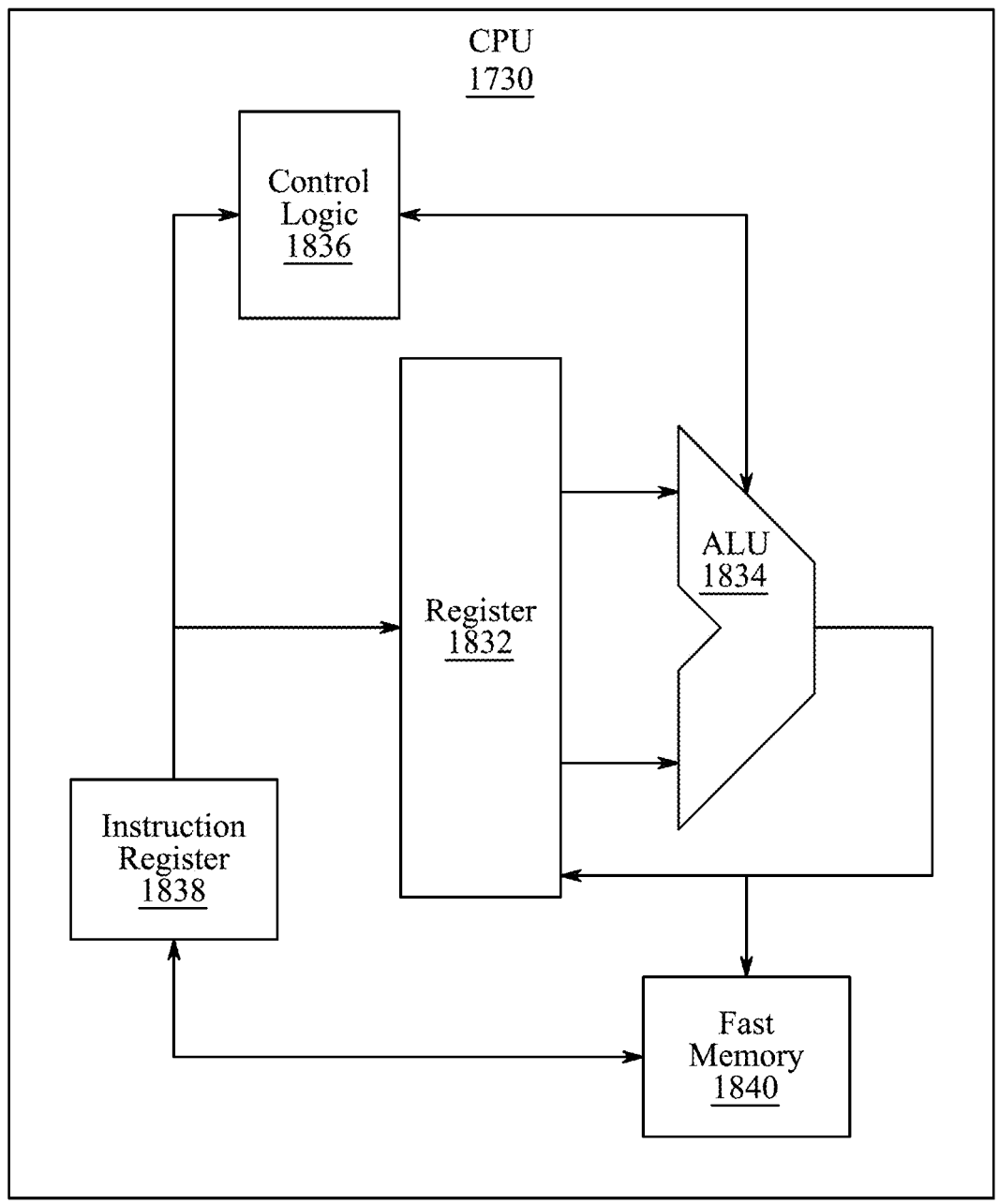
FIG. 18 is an exemplary schematic diagram of a processor used with the computing system, according to certain embodiments.

For example, FIG. 18 shows one implementation of CPU 1730. In one implementation, the instruction register 1838 retrieves instructions from the fast memory 1840. At least part of these instructions are fetched from the instruction register 1838 by the control logic 1836 and interpreted according to the instruction set architecture of the CPU 1730. Part of the instructions can also be directed to the register 1832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1834 that loads values from the register 1832 and performs logical and mathematical operations on the loaded values according to the instructions. The results from these operations can be feedback into the register and/or stored in the fast memory 1840. According to certain implementations, the instruction set architecture of the CPU 1730 can use a reduced instruction set architecture, a complex instruction set architecture, a vector processor architecture, a very large instruction word architecture. Furthermore, the CPU 1730 can be based on the Von Neuman model or the Harvard model. The CPU 1730 can be a digital signal processor, an FPGA, an ASIC, a PLA, a PLD, or a CPLD. Further, the CPU 1730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 17, the data processing system 1700 can include that the SB/ICH 1720 is coupled through a system bus to an I/O Bus, a read only memory (ROM) 1756, universal serial bus (USB) port 1764, a flash binary input/output system (BIOS) 1768, and a graphics controller 1758. PCI/PCIe devices can also be coupled to SB/ICH 1788 through a PCI bus 1762.

The PCI devices may include, for example, Ethernet adapters, add-in cards, and PC cards for notebook computers. The Hard disk drive 1760 and CD-ROM 1766 can use, for example, an integrated drive electronics (IDE) or serial advanced technology attachment (SATA) interface. In one implementation the I/O bus can include a super I/O (SIO) device.

Further, the hard disk drive (HDD) 1760 and optical drive 1766 can also be coupled to the SB/ICH 1720 through a system bus. In one implementation, a keyboard 1770, a mouse 1772, a parallel port 1778, and a serial port 1776 can be connected to the system bus through the I/O bus. Other peripherals and devices that can be connected to the SB/ICH 1720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 19:
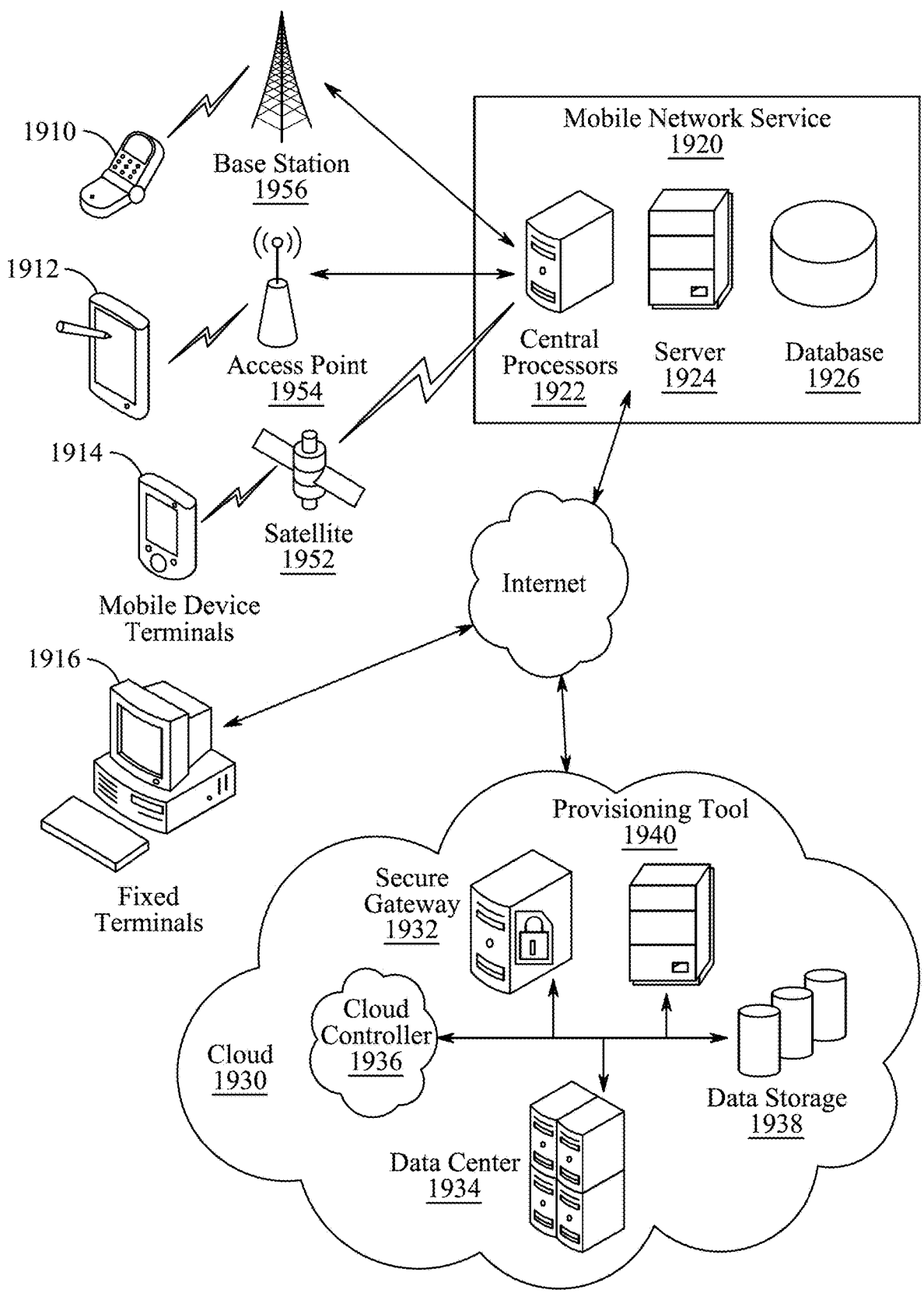
FIG. 19 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1930 including a cloud controller 1936, a secure gateway 1932, a data center 1934, data storage 1938 and a provisioning tool 1940, and mobile network services 1920 including central processors 1922, a server 1924 and a database 1926, which may share processing, as shown by FIG. 19, in addition to various human interface and communication devices (e.g., display monitors 1916, smart phones 1910, tablets 1912, personal digital assistants (PDAs) 1914). The network may be a private network, such as a LAN, satellite 1952 or WAN 1954, or be a public network, may such as the Internet. Input to the system may be received via direct user input and received remotely in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A surface plasmon resonance sensor system, comprising:
    a sensor plate having a first side and a second side, wherein the second side is opposite the first side, wherein the sensor plate includes:
        a quartz glass substrate, and
        an annealed cuprous oxide film formed by sputtering a copper film onto the quartz glass substrate then annealing the copper film at a temperature of from about 400° C. to about 600° C. for about two hours to convert the copper film to the annealed cuprous oxide film having a refractive index of about 3.05 to about 3.11, an energy band gap $E_g$ of 1.54 to 1.69 eV and a surface with a wetting contact angle of 42.3° to 85.2°;
    a quartz prism having a base surface attached to the first side of sensor plate against the quartz glass substrate;
    a microfluidics unit attached to the second side of the sensor plate against the annealed cuprous oxide film, wherein the microfluidics unit includes a fluid reservoir having an inlet port and an outlet port, wherein the fluid reservoir contains a carrier fluid;
    a target analyte reservoir containing a target analyte;
    a pump connected between the target analyte reservoir and the inlet port, wherein the pump is configured to inject the target analyte into the microfluidics unit through the inlet port;
    a binder attached to the annealed cuprous oxide film, wherein the binder is configured to attach to the target analyte;
    a laser configured to transmit a laser beam into a face of the quartz prism at an incident angle configured to generate surface plasmons which resonate with the annealed cuprous oxide film and reflect a phase shifted laser beam from the annealed cuprous oxide film;
    receive optics configured to receive the phase shifted laser beam;
    a charge coupled device coupled to the receive optics, wherein the charge coupled device is configured to convert the phase shifted laser beam to an electrical signal; and
    a computing unit including an electrical circuitry, a memory storing program instructions and at least one processor configured to execute the program instructions, wherein the computing unit is configured to receive the electrical signal and compute a refractive index based on the phase shift, wherein a change in the refractive index is configured to indicate detection of the target analyte.

2. The surface plasmon resonance sensor system of claim 1, wherein the binder is a ligand selected from a group comprising a NTA-Ni2+-His6 complex, a biotin-streptavidin combination, and an aldehyde.

3. The surface plasmon resonance sensor system of claim 1, wherein the annealed cuprous oxide film has a thickness of about 40 nm and is configured to resonate when a spectral wavelength of the laser beam is in a range of about 600 nm to about 800 nm.

4. The surface plasmon resonance sensor system of claim 1, wherein the annealed cuprous oxide film has a refractive index of about 3.05, an energy band gap $E_g$ of 1.69 eV and a surface with a wetting contact angle of 85.2°.

5. The surface plasmon resonance sensor system of claim 1, wherein the annealed cuprous oxide film has a refractive index of about 3.11, an energy band gap $E_g$ of 1.54 eV and a surface with a wetting contact angle of 42.3°.

6. The surface plasmon resonance sensor system of claim 3, wherein the annealed cuprous oxide film is configured to resonate when interrogated by the laser beam at a spectral wavelength of about 600 nm and at an incident angle of about 44.7°.

7. The surface plasmon resonance sensor system of claim 3, wherein the annealed cuprous oxide film is configured to resonate when interrogated by the laser beam at a spectral wavelength of about 700 nm and at an incident angle of about 42.7°.

8. The surface plasmon resonance sensor system of claim 3, wherein the annealed cuprous oxide film is configured to resonate when interrogated by the laser beam at a spectral wavelength of about 800 nm and at an incident angle of about 42.15°.

9. The surface plasmon resonance sensor system of claim 1, wherein the annealed cuprous oxide film consists of cuprous oxide.

* * * * *